US011245302B2

(12) United States Patent
Homma et al.

(10) Patent No.: US 11,245,302 B2
(45) Date of Patent: Feb. 8, 2022

(54) ELECTRIC PUMP APPARATUS

(71) Applicants: Nidec Corporation, Kyoto (JP); Nidec Tosok Corporation, Zama (JP)

(72) Inventors: Kazuhiro Homma, Kyoto (JP); Tomohiro Sakata, Zama (JP); Susumu Maeda, Zama (JP); Masato Aono, Kyoto (JP); Takashi Hattori, Kyoto (JP)

(73) Assignees: NIDEC CORPORATION, Kyoto (JP); NIDEC TOSOK CORPORATION, Kanagawa (JP)

( * ) Notice: Subject to any disclaimer, the term of this patent is extended or adjusted under 35 U.S.C. 154(b) by 230 days.

(21) Appl. No.: 16/574,242

(22) Filed: Sep. 18, 2019

(65) Prior Publication Data

US 2020/0106321 A1    Apr. 2, 2020

(30) Foreign Application Priority Data

Sep. 28, 2018 (JP) .............................. JP2018-185851

(51) Int. Cl.
*H02K 3/52* (2006.01)
*H02K 7/08* (2006.01)
(Continued)

(52) U.S. Cl.
CPC ............. *H02K 3/522* (2013.01); *F04B 17/03* (2013.01); *H02K 7/083* (2013.01); *H02K 11/33* (2016.01);
(Continued)

(58) Field of Classification Search
CPC ........ H02K 3/522; H02K 7/083; H02K 11/33; H02K 21/16; H02K 2211/03;
(Continued)

(56) References Cited

U.S. PATENT DOCUMENTS 10,128,720 B2 *  11/2018  Ishizeki ................ F04C 15/008
2008/0211332 A1    9/2008  Kataoka et al.
(Continued)

FOREIGN PATENT DOCUMENTS

CN    101257237 A    9/2008
CN    103206374 A    7/2013
(Continued)

OTHER PUBLICATIONS

Official Communication issued in corresponding Chinese Patent Application No. 201910918196.5, dated May 27, 2021.

*Primary Examiner* — Tulsidas C Patel
*Assistant Examiner* — Riley Owen Stout
(74) *Attorney, Agent, or Firm* — Keating & Bennett

(57) ABSTRACT

An electric pump apparatus includes a motor, an inverter board, a coil support, a housing, and a pump portion driven by the motor. Coils include first end portions and second end portions drawn out from the coils, the first end portion and the second end portion defining both end portions of each of conducting wires of the coils. The inverter board is on a first axial side of the motor. The coil support includes a neutral point busbar that electrically connects the coils to one another. The coil support includes a first region including the first end portions arranged therein, each first end portion being directly connected to the inverter board, and a second region including the second end portions and the neutral point busbar arranged therein, each second end portion being connected to the neutral point busbar.

10 Claims, 10 Drawing Sheets

(51) Int. Cl.
*H02K 11/33* (2016.01)
*F04B 17/03* (2006.01)
*H02K 21/16* (2006.01)

(52) U.S. Cl.
CPC ......... *H02K 21/16* (2013.01); *H02K 2203/09* (2013.01); *H02K 2211/03* (2013.01)

(58) Field of Classification Search
CPC ...... H02K 2203/09; H02K 1/278; H02K 5/10; H02K 5/15; H02K 5/1732; H02K 7/14; H02K 3/50; H02K 3/46; H02K 5/04; H02K 2203/12; F04B 17/03; F04B 53/16
See application file for complete search history.

(56) References Cited

U.S. PATENT DOCUMENTS

| | | | |
|---|---|---|---|
| 2013/0189134 | A1 | 7/2013 | Irie et al. |
| 2014/0326530 | A1 | 11/2014 | Asao et al. |
| 2016/0190887 | A1 | 6/2016 | Sambuichi et al. |

FOREIGN PATENT DOCUMENTS

| | | |
|---|---|---|
| CN | 105743288 A | 7/2016 |
| JP | 2013-236455 A | 11/2013 |
| JP | 2018-071499 A | 5/2018 |
| WO | 2013/111365 A1 | 8/2013 |

\* cited by examiner

ELECTRIC PUMP APPARATUS

CROSS REFERENCE TO RELATED APPLICATION

The present invention claims priority under 35 U.S.C. § 119 to Japanese Application No. 2018-185851 filed on Sep. 28, 2018 the entire content of which is incorporated herein by reference.

FIELD OF THE INVENTION

The present invention relates to an electric pump apparatus.

BACKGROUND

An electric pump apparatus includes a motor, a board, a housing, and a pump. In a known electric pump, a circuit board is arranged adjacent to a housing on one side of a drive shaft. A terminal is fixed to the housing, and the terminal is electrically connected to the circuit board.

SUMMARY

An electric pump apparatus according to an example embodiment of the present disclosure includes a motor, an inverter board electrically connected to the motor, a coil support between the motor and the inverter board, a housing that houses the motor, the inverter board, and the coil support, and a pump portion driven by power of the motor. The motor includes a rotor including a shaft that extends along a central axis, and a stator radially opposite to the rotor. The stator includes a plurality of coils. The coils include first end portions and second end portions drawn out from the coils, the first end portion and the second end portion defining both end portions of each of conducting wires of the coils. The inverter board is on a first axial side of the motor. The coil support includes a neutral point busbar that electrically connects the plurality of coils to one another. The coil support includes a first region including the first end portions arranged therein, each first end portion being directly connected to the inverter board and a second region including the second end portions and the neutral point busbar arranged therein, each second end portion being connected to the neutral point busbar.

The above and other elements, features, steps, characteristics and advantages of the present disclosure will become more apparent from the following detailed description of the example embodiments with reference to the attached drawings.

DETAILED DESCRIPTION

Figure 1:
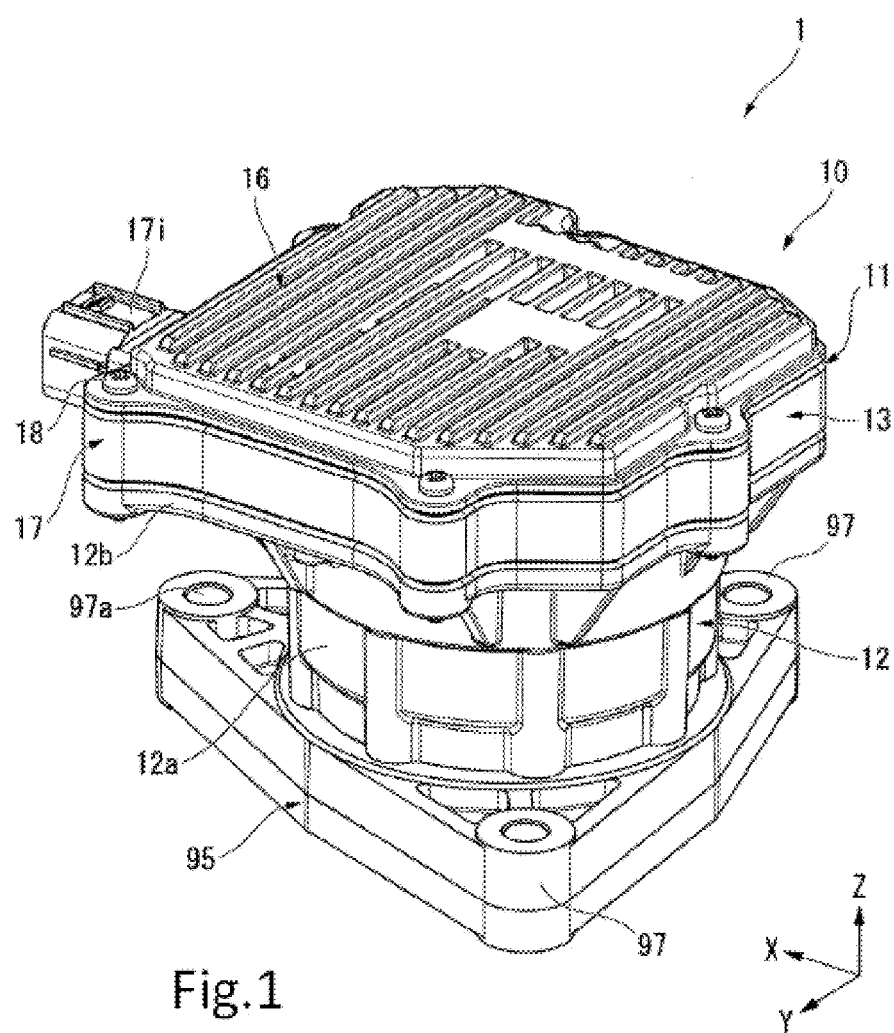
FIG. 1 is a perspective view of an electric pump apparatus including a motor unit according to an example embodiment of the present disclosure.
Figure 2:
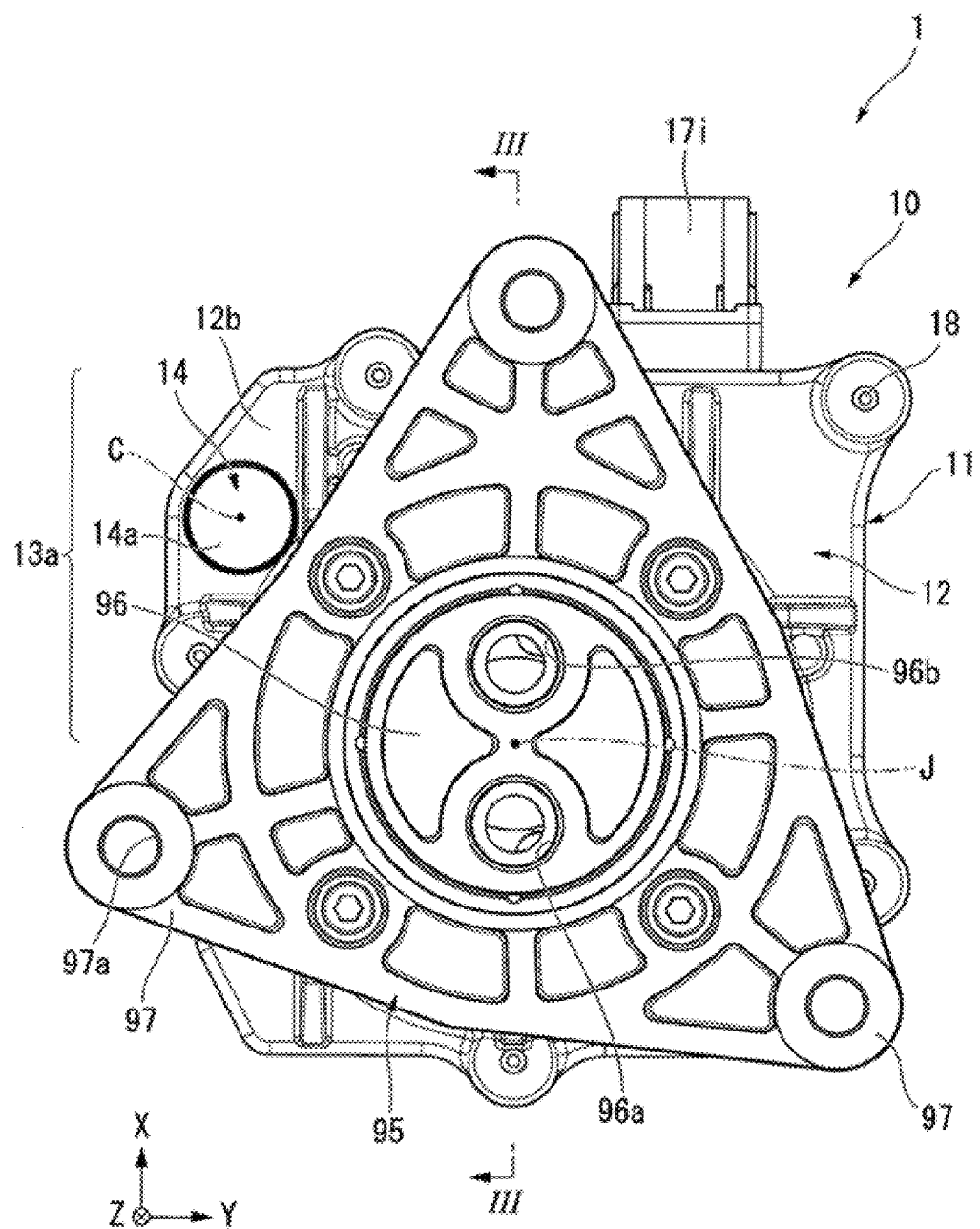
FIG. 2 is a front view of the electric pump apparatus including the motor unit according to an example embodiment of the present disclosure.
Figure 3:
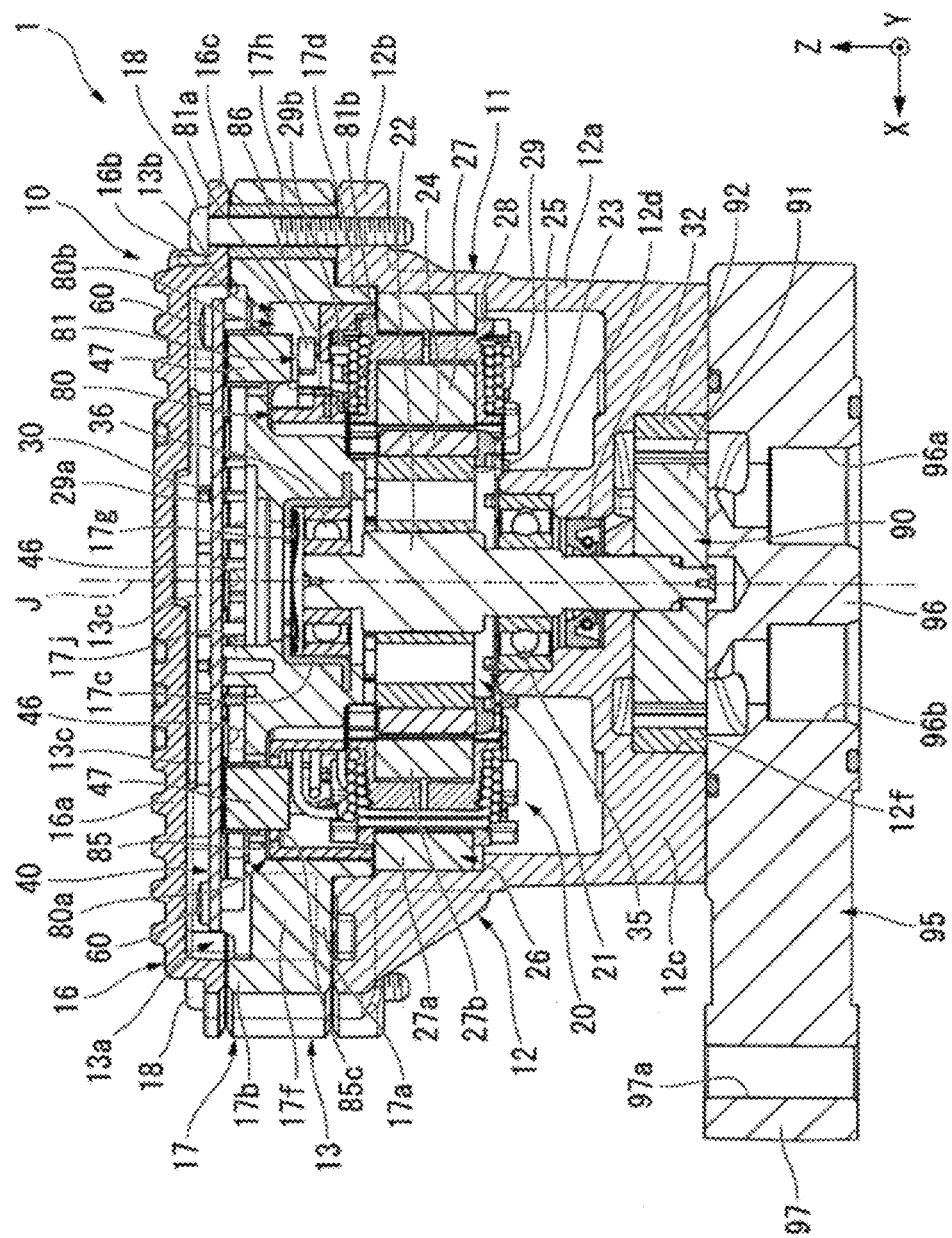
FIG. 3 is a vertical sectional view of the electric pump apparatus taken along line in FIG. 2.
Figure 4:
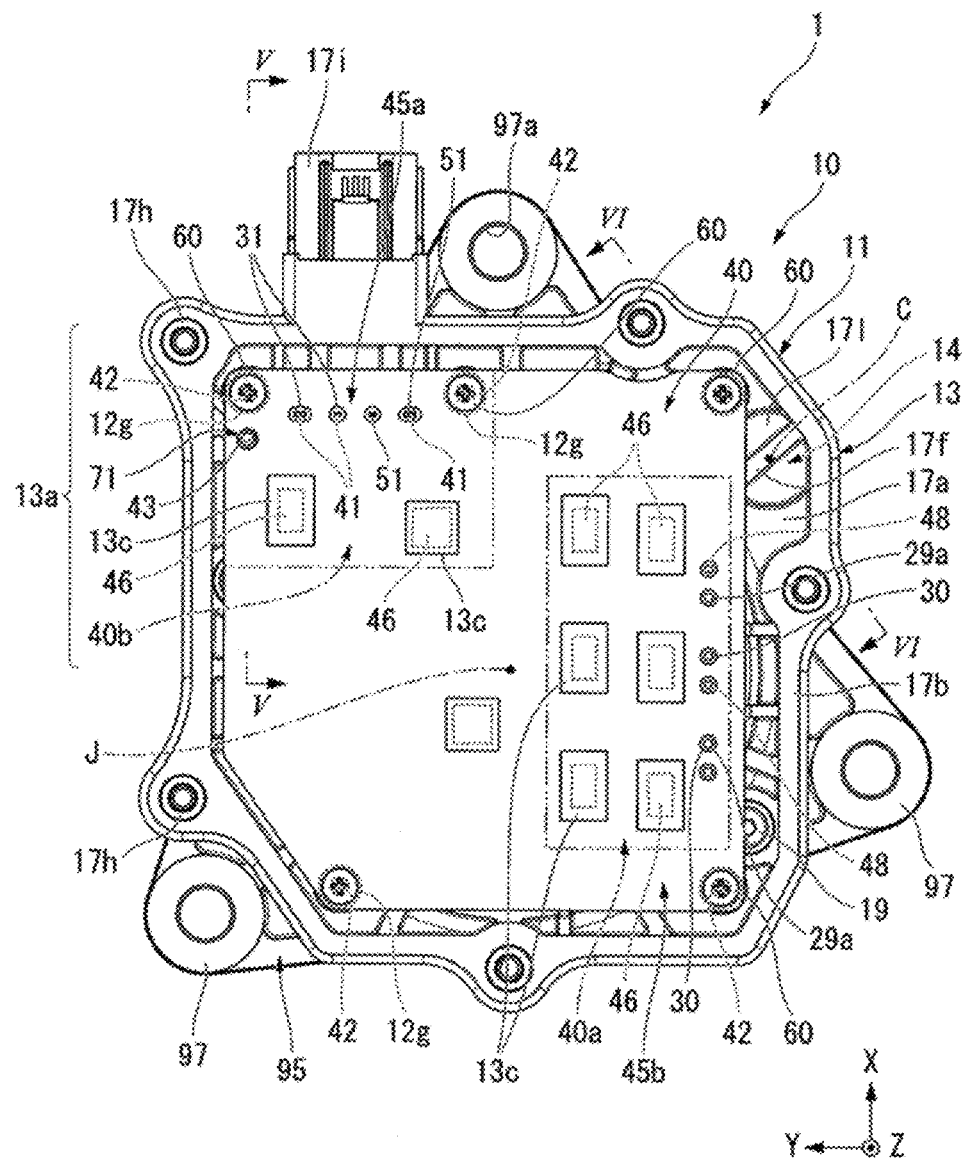
FIG. 4 is a rear view (or a plan view) of the electric pump apparatus including the motor unit according to an example embodiment of the present disclosure with a first member of an inverter housing portion and so on removed from the apparatus.

An electric pump apparatus 1 including a motor unit 10 according to an example embodiment of the present disclosure will be described below with reference to the accompanying drawings. In the accompanying drawings, an xyz coordinate system is shown appropriately as a three-dimensional orthogonal coordinate system. The motor unit 10 includes a motor 20 and an inverter board 40. The motor 20 has a central axis J, and the central axis J extends along a z-axis direction. In the following description, unless otherwise specified, a direction parallel to the central axis J is simply referred to by the term "axial direction", "axial", or "axially". The motor 20 and the inverter board 40 are arranged at different axial positions. In other words, the inverter board 40 and the motor 20 are arranged one above the other in an axial direction. In the axial direction, a side on which the inverter board 40 lies with respect to the motor 20 is referred to as a first axial side (or a +z side), while a side on which the motor 20 lies with respect to the inverter board 40 is referred to as a second axial side (or a −z side). Radial directions centered on the central axis J are simply referred to by the term "radial direction", "radial", or "radially". In a radial direction, a side closer to the central axis J is referred to as a radially inner side, while a side away from the central axis J is referred to as a radially outer side. A circumferential direction about the central axis J, i.e., a direction encircling the central axis J, is simply referred to by the term "circumferential direction", "circumferential", or "circumferentially". It is assumed that the term "parallel" as used herein may include both "parallel" and "substantially parallel", and that the term "perpendicular" as used herein may include both "perpendicular" and "substantially perpendicular".

The electric pump apparatus 1 according to the present example embodiment is arranged to suck a fluid, such as, for example, an oil, and discharge the fluid. The electric pump apparatus 1 has a function of, for example, causing the fluid to circulate through a flow channel. In the case where the fluid is an oil, the electric pump apparatus 1 may alternatively be referred to as an electric oil pump apparatus. Although no illustration is provided, the electric pump apparatus 1 is arranged in, for example, a driving apparatus of a vehicle or the like. That is, the electric pump apparatus 1 is installed in, for example, a vehicle.

As illustrated in FIGS. 1 to 9, the motor unit 10 includes a housing 11, fastening screws 18, fixing screws 19, the motor 20, the inverter board 40, wiring members 50, screw members 60, and a coil support 80. The electric pump apparatus 1 includes the motor unit 10, a pump portion 90, and a pump cover 95. That is, the electric pump apparatus 1 includes the housing 11, the fastening screws 18, the fixing screws 19, the motor 20, the inverter board 40, the wiring members 50, the screw members 60, the coil support 80, the pump portion 90, and the pump cover 95. In the present example embodiment, a pair of principal surfaces of the inverter board 40 are arranged to face in the axial direction. A first one (hereinafter referred to as a "first principal surface" as appropriate) of the pair of principal surfaces of the inverter board 40 faces to the first axial side. A second one (hereinafter referred to as a "second principal surface" as appropriate) of the pair of principal surfaces of the inverter board 40 faces to the second axial side. The wording "when viewed in the axial direction" as used herein has the same meaning as the wording "in a plan view of the inverter board 40".

The housing 11 is arranged to house the motor 20 and the inverter board 40. The housing 11 includes a motor housing portion 12, an oil seal 32, a shank portion 33, an inverter housing portion 13, and a breather portion 14. The motor housing portion 12 is arranged to house the motor 20. In the present example embodiment, the motor housing portion 12 is arranged to house the pump portion 90 as well. That is, the housing 11 is arranged to house the pump portion 90 as well. According to the present example embodiment, the structure of the electric pump apparatus 1 can be simplified with the motor 20 and the pump portion 90 being housed in the motor housing portion 12. This leads to facilitating assembly of the electric pump apparatus 1.

The motor housing portion 12 is made of a metal. The motor housing portion 12 is defined by a single monolithic member. The motor housing portion 12 includes a housing tubular portion 12a, a collar portion 12b, a pump housing wall portion 12c, a bearing holding tubular portion 12d, and support portions 12g.

The housing tubular portion 12a is tubular, and is arranged to extend in the axial direction. In the present example embodiment, the housing tubular portion 12a is in the shape of a hollow cylinder. The motor 20 is housed in the housing tubular portion 12a. The collar portion 12b is arranged to extend radially outward from an end portion of the housing tubular portion 12a on the first axial side. The collar portion 12b is plate-shaped, having principal surfaces facing in the axial direction. In the present example embodiment, an external shape of the collar portion 12b when viewed in the axial direction is substantially polygonal.

Figure 5:
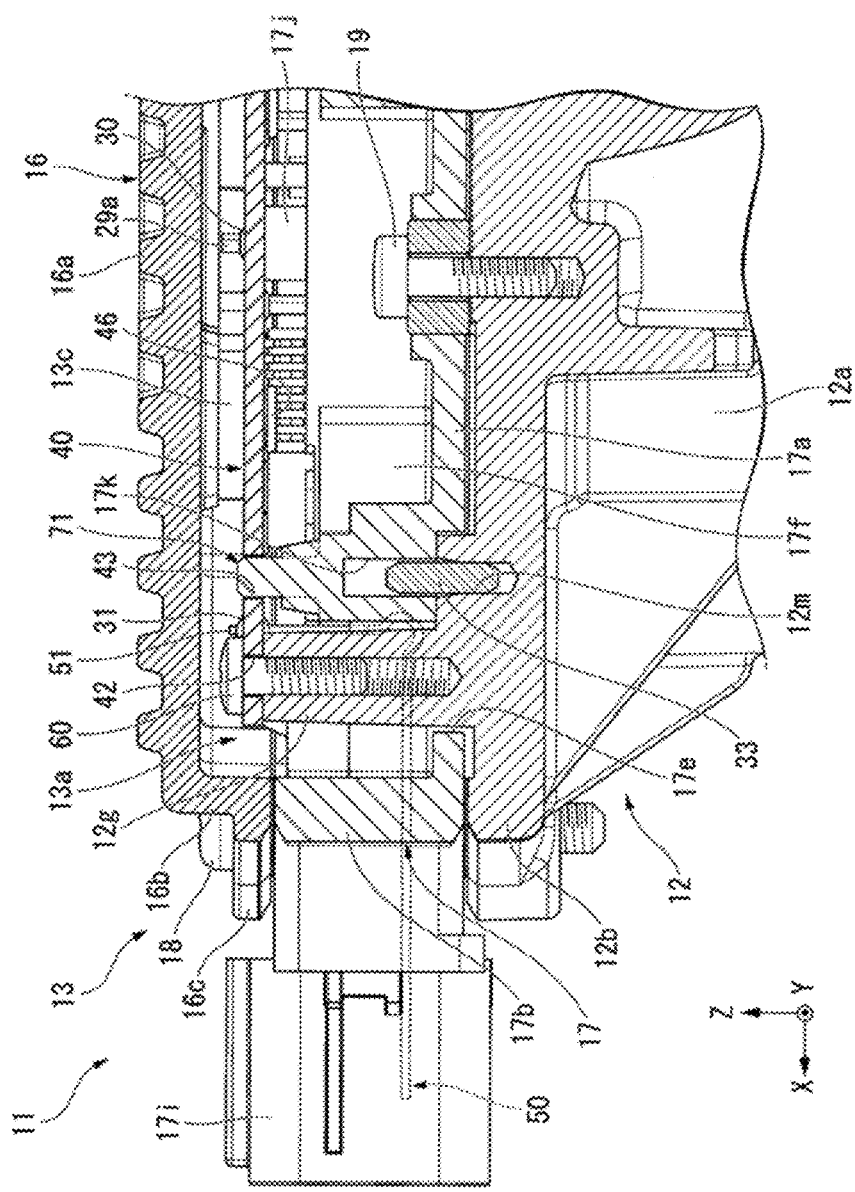
FIG. 5 is a vertical sectional view of a portion of the electric pump apparatus taken along line V-V in FIG. 4.
Figure 6:
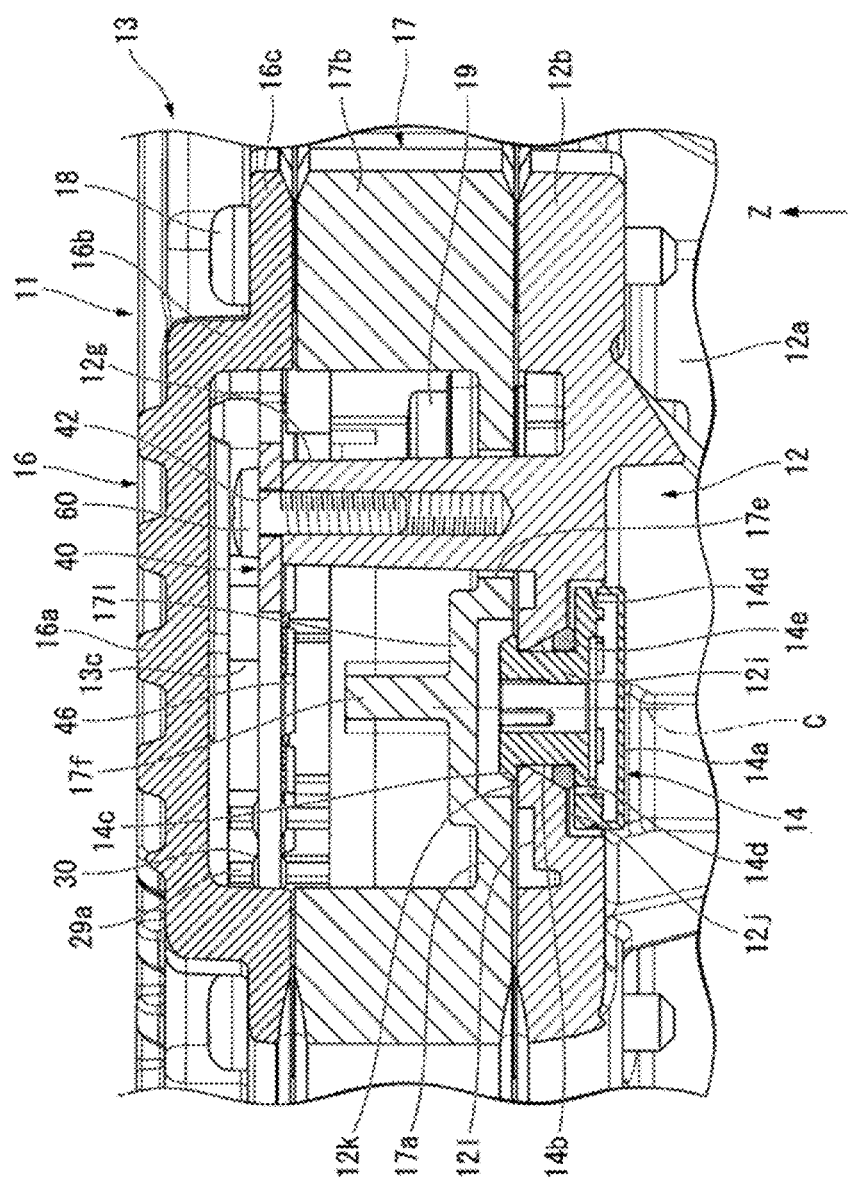
FIG. 6 is a vertical sectional view of a portion of the electric pump apparatus taken along line VI-VI in FIG. 4.
Figure 7:
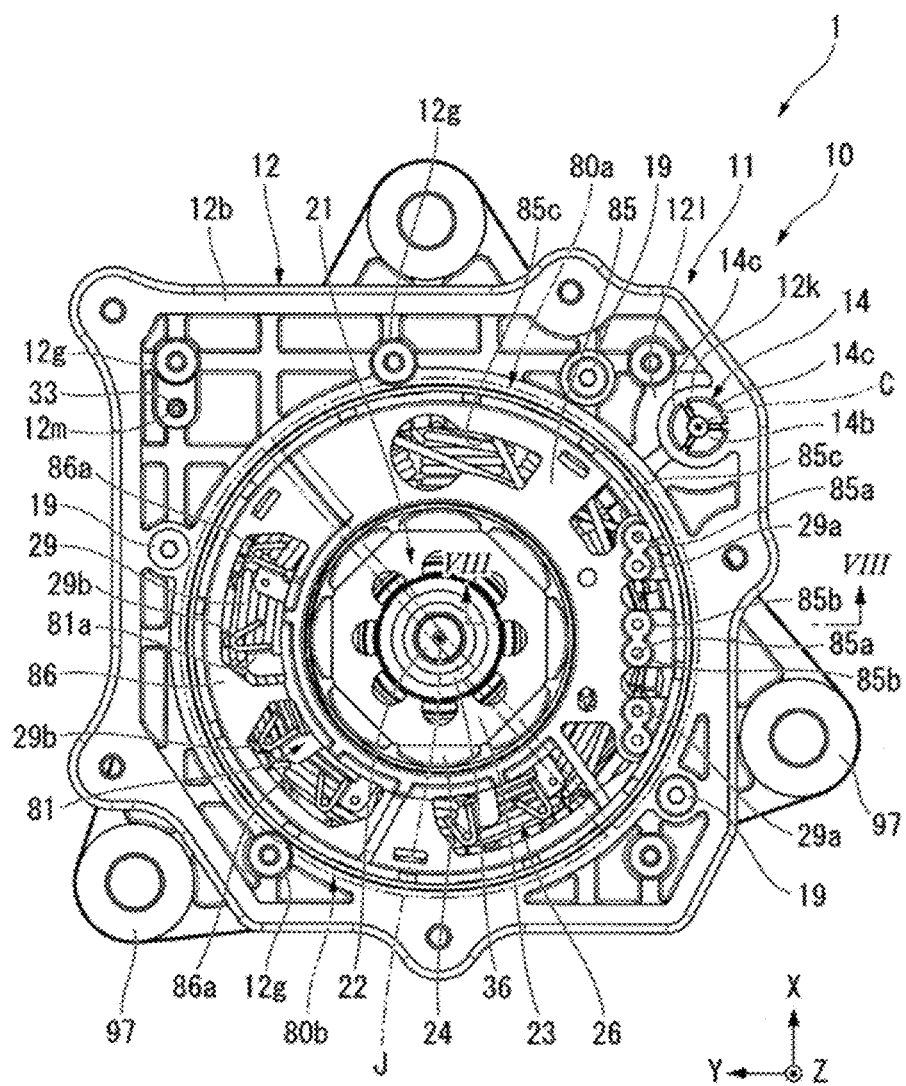
FIG. 7 is a rear view of the electric pump apparatus including the motor unit according to an example embodiment of the present disclosure with the inverter housing portion, an inverter board, and so on removed from the apparatus.
Figure 8:
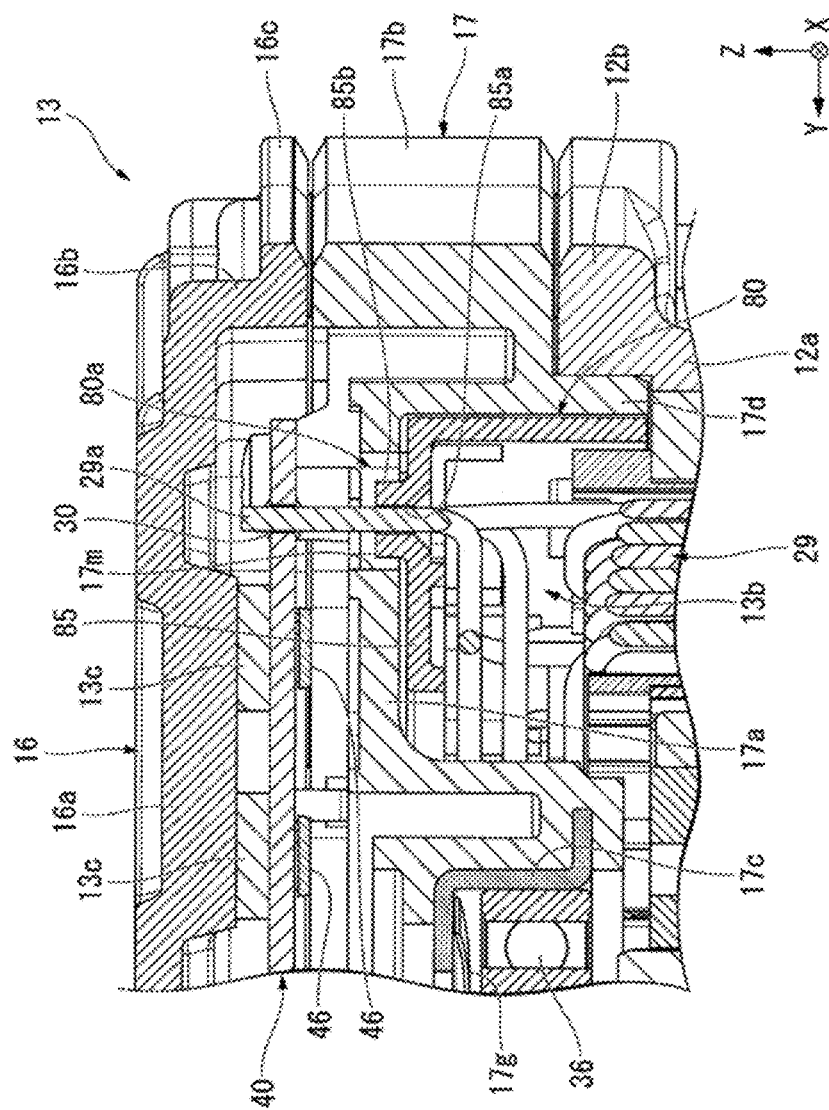
FIG. 8 is a vertical sectional view of a portion of the electric pump apparatus taken along line VIII-VIII in FIG. 7.

The collar portion 12b includes a breather fitting hole 12i, a breather housing recessed portion 12j, a claw portion support surface 12k, a surrounding surface 12l, and a shank portion fitting hole 12m (see FIGS. 5 and 6). The breather fitting hole 12i is arranged to pass through the collar portion 12b in the axial direction. The breather fitting hole 12i includes a portion in the shape of a tapered hole increasing in diameter toward the second axial side. The breather fitting hole 12i is arranged to overlap with a wiring member arrangement region 13a, which will be described below, when viewed in the axial direction.

The breather housing recessed portion 12j is recessed to the first axial side from a surface of the collar portion 12b which faces to the second axial side. The breather housing recessed portion 12j is in the shape of a circular ring when viewed in the axial direction. The breather housing recessed portion 12j is arranged to have an inside diameter greater than an inside diameter of the breather fitting hole 12i. The breather housing recessed portion 12j includes a bottom surface facing to the second axial side, and joined to a wall surface of the breather fitting hole 12i.

The claw portion support surface 12k is arranged in a surface of the collar portion 12b which faces to the first axial side. In the present example embodiment, the claw portion support surface 12k is a flat surface perpendicular to the central axis J. The claw portion support surface 12k is substantially annular when viewed in the axial direction, and is arranged to surround the breather fitting hole 12i from outside (see FIG. 7). An inner circumferential portion of the claw portion support surface 12k is joined to an end portion (i.e., an opening portion) of the breather fitting hole 12i on the first axial side.

The surrounding surface 12l is arranged in the surface of the collar portion 12b which faces to the first axial side. The surrounding surface 12l is substantially in the shape of the letter "C" when viewed in the axial direction. The surrounding surface 12l is arranged to surround the claw portion support surface 12k from outside in breather radial directions when viewed in the axial direction. Note that the breather radial directions refer to radial directions centered on a breather central axis C as described below. The surrounding surface 12l is arranged on the second axial side of the claw portion support surface 12k. That is, an axial position of the surrounding surface 12l is on the second axial side of an axial position of the claw portion support surface 12k.

The shank portion fitting hole 12m is recessed to the second axial side from the surface of the collar portion 12b which faces to the first axial side. The shank portion fitting hole 12m is arranged to extend in the axial direction. The shank portion fitting hole 12m is in the shape of a circular hole.

The pump housing wall portion 12c is arranged at an end portion of the housing tubular portion 12a on the second axial side. The pump housing wall portion 12c is arranged inside of the housing tubular portion 12a. The pump housing wall portion 12c is arranged to close an opening of the housing tubular portion 12a on the second axial side. The pump housing wall portion 12c is plate-shaped, having principal surfaces facing in the axial direction. In the present example embodiment, the pump housing wall portion 12c is substantially disk-shaped. The pump housing wall portion 12c is arranged to house the pump portion 90. The pump housing wall portion 12c includes a pump housing hole 12f and a plurality of lightening holes (not shown).

The pump housing hole 12f is recessed to the first axial side from one of the principal surfaces of the pump housing wall portion 12c which faces to the second axial side. In the present example embodiment, the pump housing hole 12f is in the shape of a circular hole. The pump housing hole 12f is arranged in a central portion of the pump housing wall portion 12c when viewed in the axial direction. Although no illustration is provided, the lightening holes are recessed to the second axial side from one of the principal surfaces of the pump housing wall portion 12c which faces to the first axial side, and are arranged apart from one another in a circumferential direction. The lightening holes are arranged radially outward of the pump housing hole 12f.

The bearing holding tubular portion 12d is tubular, and is arranged to extend to the first axial side from the pump housing wall portion 12c. The bearing holding tubular portion 12d is arranged to project to the first axial side from the one of the principal surfaces of the pump housing wall portion 12c which faces to the first axial side. The bearing holding tubular portion 12d is arranged to hold a first bearing 35, which will be described below, of the motor 20. The first bearing 35 is one of a plurality of bearings 35 and 36 arranged apart from each other in the axial direction in the motor 20, and is arranged on the second axial side of a rotor core 23, which will be described below. The first bearing 35 is fitted inside of the bearing holding tubular portion 12d.

Each support portion 12g is arranged to extend in the axial direction. The support portion 12g is arranged at the collar portion 12b, and is arranged to extend to the first axial side from the collar portion 12b. The support portion 12g is arranged to project to the first axial side from one of the principal surfaces of the collar portion 12b which faces to the first axial side. The number of support portions 12g is more than one. The support portions 12g are arranged apart from one another in the circumferential direction when viewed in the axial direction. In more detail, the support portions 12g are arranged apart from one another at positions overlapping with an outer circumferential portion of the inverter board 40 when viewed in the axial direction, i.e., in the plan view of the inverter board 40.

In the present example embodiment, each support portion 12g is substantially in the shape of a hollow cylinder. The support portion 12g is arranged to decrease in outside diameter toward the first axial side. An outer circumferential surface of the support portion 12g is in a tapered shape. The support portion 12g includes a female screw portion in an inner circumferential surface of the support portion 12g. An end surface of the support portion 12g which faces to the first axial side is flat and perpendicular to the central axis J. The end surface of the support portion 12g which faces to the first axial side is arranged to be in contact with the one of the principal surfaces of the inverter board 40 which faces to the second axial side.

Each support portion 12g is arranged inside of the inverter housing portion 13. The support portion 12g is arranged to extend inside of the inverter housing portion 13. The support portion 12g is fixed to the inverter board 40. According to the present example embodiment, with the inverter board 40 being fixed to the support portions 12g of the motor housing portion 12, an improvement in rigidity with which the inverter board 40 is fitted to the housing 11 is achieved, resulting in improved vibration damping of the inverter board 40. This contributes to preventing vibration of the inverter board 40 relative to a stator 26, which will be described below, fixed to the motor housing portion 12 through, for example, shrink fitting. Thus, durability of a solder 30 used to fix each of first end portions 29a of coils 29, which will be described below, of the stator 26 to the inverter board 40 can be increased. In addition, durability of a solder 31 used to fix each of terminals 51, which will be described below, of the wiring members 50 to the inverter board 40 can also be increased.

In addition, according to the present example embodiment, each support portion 12g is arranged to extend in the axial direction from the collar portion 12b, which is arranged radially outward of the housing tubular portion 12a, to support the inverter board 40. Therefore, even when the inverter board 40 is larger in contour than the housing tubular portion 12a, the inverter board 40 can be supported by the support portions 12g with increased stability.

In addition, according to the present example embodiment, the inverter board 40 is supported with increased stability by the plurality of support portions 12g. Further, since the support portions 12g are arranged on the outer circumferential portion of the inverter board 40, an influence of the support portions 12g on flexibility of a wiring pattern of the inverter board 40 can be limited. Furthermore, since the motor housing portion 12 is made of a metal, an additional improvement in the vibration damping of the inverter board 40 can be achieved by a high rigidity of the motor housing portion 12.

In addition, according to the present example embodiment, each support portion 12g is a portion of the motor housing portion 12 defined by a single monolithic member, that is, each support portion 12g is defined integrally with the motor housing portion 12, and this allows good sealing around the support portion 12g to be maintained. This contributes to preventing water or the like from intruding into interiors of the motor housing portion 12 and the inverter housing portion 13 from outside the apparatus through an area around each support portion 12g. Other features and advantageous effects of the support portions 12g will be described below together with a description of the inverter housing portion 13.

The oil seal 32 is annular, and is centered on the central axis J. The oil seal 32 is arranged inside of the bearing holding tubular portion 12d, and is arranged on the second axial side of the first bearing 35. The shank portion 33 is a pin member arranged to extend in the axial direction. The shank portion 33 is fitted into the shank portion fitting hole 12m. The shank portion 33 is arranged to project to the first axial side from the collar portion 12b.

The inverter housing portion 13 is arranged to house the inverter board 40. In the present example embodiment, the inverter housing portion 13 is arranged to house the coil support 80 as well. That is, the housing 11 is arranged to house the coil support 80 as well. The inverter housing portion 13 is arranged on the first axial side of the collar portion 12b, and is arranged to overlap with the collar portion 12b when viewed in the axial direction. The inverter housing portion 13 includes a first member 16, a second member 17, and thermally conductive sheets 13c. In addition, the inverter housing portion 13 includes the wiring member arrangement region 13a and a coil support housing space 13b.

The first member 16 may alternatively be referred to as a cover member of the inverter housing portion 13. The first member 16 is made of a metal. The first member 16 is arranged on the first axial side of the inverter board 40 to cover the inverter board 40 on the first axial side. The first member 16 is arranged opposite to the first one of the pair of principal surfaces of the inverter board 40. The first member 16 is arranged opposite to the first principal surface of the inverter board 40, which faces to the first axial side, in the axial direction with a gap therebetween. The first member 16 is tubular and has a top.

The first member 16 includes a top wall 16a, a lateral wall 16b, and a flange 16c. The top wall 16a is arranged opposite to the first principal surface of the inverter board 40. The lateral wall 16b is tubular, and is arranged to extend to the second axial side from an outer circumferential portion of the top wall 16a. The lateral wall 16b is arranged to overlap with the inverter board 40 when viewed in a radial direction. The flange 16c is arranged to extend radially outward from an end portion of the lateral wall 16b on the second axial side.

The second member 17 may alternatively be referred to as a body member of the inverter housing portion 13. The second member 17 is positioned between the motor housing portion 12 and the first member 16 in the axial direction. That is, the second member 17 is arranged between the motor housing portion 12 and the first member 16. The second member 17 is fixed to the collar portion 12b. The second member 17 is fixed through the fastening screws 18 while being held between the collar portion 12b and the flange 16c in the axial direction. The number of fastening screws 18 is more than one. The fastening screws 18 are arranged apart from one another in the circumferential direction.

According to the present example embodiment, with the second member 17 being fixed to the collar portion 12b, the inverter housing portion 13 is fixed to the motor housing portion 12 over a relatively large area, allowing the inverter housing portion 13 to be stably fixed to the motor housing portion 12. In addition, a reduction in axial dimension of the inverter housing portion 13 can be achieved with a sufficient inner capacity of the inverter housing portion 13.

The second member 17 is arranged on the second axial side of the inverter board 40 to cover the inverter board 40 on the second axial side. The second member 17 is arranged opposite to the second one of the pair of principal surfaces of the inverter board 40. The second member 17 is arranged opposite to the second principal surface of the inverter board 40, which faces to the second axial side, in the axial direction with a gap therebetween. The second member 17 is tubular and has a bottom.

The second member 17 includes a bottom wall portion 17a and a lateral wall portion 17b. That is, the inverter housing portion 13 includes the bottom wall portion 17a and the lateral wall portion 17b. The bottom wall portion 17a is arranged opposite to the second principal surface of the inverter board 40. In other words, the bottom wall portion 17a is arranged opposite to the one of the pair of principal surfaces of the inverter board 40 which faces to the second axial side. The bottom wall portion 17a is plate-shaped, having principal surfaces facing in the axial direction. The bottom wall portion 17a is fixed to the collar portion 12b through the fixing screws 19. That is, the second member 17 is fixed to the motor housing portion 12 through the fixing screws 19. The number of fixing screws 19 is more than one. The fixing screws 19 are arranged apart from one another in the circumferential direction. The fixing screws 19 are used to temporarily fix the second member 17 to the motor housing portion 12 until the inverter housing portion 13 and the motor housing portion 12 are fastened to each other through the fastening screws 18. Note that the temporal fixing achieved here means a condition of being temporarily fixed as required in a process of assembly. The number of fixing screws 19 is smaller than the number of fastening screws 18. With the second member 17 being fixed to the motor housing portion 12 through the fixing screws 19, relative positions of the inverter board 40, which is fixed to the support portions 12g of the motor housing portion 12, and the terminals 51 of the wiring members 50, which are held by a connector portion 17i, which will be described below, of the second member 17, are stabilized, facilitating connection of the terminals 51 to the inverter board 40.

The bottom wall portion 17a includes a bearing holder 17c, a wave washer 17g, a fitting tubular portion 17d, through holes 17e, rib portions 17f, a pin portion 71, a boss portion 17j, an insert hole 17k, a breather housing wall portion 17l, and tubular portion arrangement holes 17m. That is, the second member 17 includes the bearing holder 17c, the through holes 17e, and the boss portion 17j. In addition, the pin portion 71 is arranged in the inverter housing portion 13.

The bearing holder 17c is made of a metal. When the second member 17 is defined by an injection molding process, the bearing holder 17c is placed in a mold (not shown) together with other metal parts. A molten resin is filled into this mold and is hardened therein, so that the second member 17 is defined together with the bearing holder 17c by an insert molding process. That is, the second member 17 includes a portion made of the resin. According to the present example embodiment, an increase in flexibility in the shape of the second member 17 is achieved by a portion of the second member 17 being made of a resin. This makes it easier to provide the second member 17 with the connector portion 17i, which will be described below, and so on.

The bearing holder 17c is tubular and has a top. The bearing holder 17c is arranged to hold at least one of the plurality of bearings 35 and 36, which will be described below, of the motor 20, i.e., at least a second bearing 36. The bearing holder 17c is arranged to hold the second bearing 36. The second bearing 36 is one of the plurality of bearings 35 and 36 which is arranged on the first axial side of the rotor core 23, which will be described below. The second bearing 36 is fitted inside of the bearing holder 17c.

The wave washer 17g is annular, and is centered on the central axis J. The wave washer 17g is arranged inside of the bearing holder 17c, and is positioned between a top wall portion of the bearing holder 17c and the second bearing 36 in the axial direction. The wave washer 17g is arranged to be in axial contact with each of the top wall portion of the bearing holder 17c and the second bearing 36. The wave washer 17g is arranged between the bearing holder 17c and the second bearing 36 to urge the bearing holder 17c and the second bearing 36 away from each other in the axial direction.

The fitting tubular portion 17d is tubular, and is arranged to extend to the second axial side from the bottom wall portion 17a. The fitting tubular portion 17d is fitted inside of the housing tubular portion 12a. In the present example embodiment, the fitting tubular portion 17d is in the shape of a hollow cylinder, and is fitted to an inside of the end portion (i.e., an opening portion) of the housing tubular portion 12a on the first axial side. According to the present example embodiment, with the fitting tubular portion 17d of the bottom wall portion 17a being fitted inside of the housing tubular portion 12a of the motor housing portion 12, the bearing 36, which is held by the bearing holder 17c of the bottom wall portion 17a, is positioned coaxially with the central axis J of a shaft 22. Thus, performance of the motor 20 is stabilized.

Each through hole 17e is arranged to pass through the bottom wall portion 17a in the axial direction. In the present example embodiment, the through hole 17e is in the shape of a circular hole. The number of through holes 17e is more than one. The through holes 17e are arranged apart from one another in the circumferential direction when viewed in the axial direction. In more detail, the through holes 17e are arranged apart from one another at positions overlapping with the outer circumferential portion of the inverter board 40 when viewed in the axial direction, i.e., in the plan view of the inverter board 40. Each through hole 17e is arranged to have one of the support portions 12g inserted therethrough. That is, the corresponding support portion 12g is inserted through each through hole 17e. According to the present example embodiment, sufficient sealing between the inverter housing portion 13 and the motor housing portion 12 can be easily achieved by the support portions 12g being passed through the respective through holes 17e of the second member 17. In addition, rough positioning of the inverter housing portion 13 and the motor housing portion 12 relative to each other can thus be achieved, resulting in improved assembling workability.

Here, the support portions 12g will now be described below. Each support portion 12g is arranged to pass through the second member 17. The support portion 12g is arranged to pass through the bottom wall portion 17a of the second member 17 in the axial direction. According to the present example embodiment, the support portions 12g can be arranged in an interior of the inverter housing portion 13 with a simple structure. In addition, the inverter board 40 can be supported by the support portions 12g. The support portions 12g are arranged inside of the lateral wall portion 17b when viewed in the axial direction. Each support portion 12g is arranged to project to the first axial side relative to the lateral wall portion 17b when viewed in a radial direction. According to the present example embodiment, the inverter board 40, which is supported by tops of the support portions 12g, is arranged on the first axial side of the lateral wall portion 17b of the second member 17. That is, the second principal surface of the inverter board 40 is arranged on the first axial side of the lateral wall portion 17b. This makes it easier to visually check from a radial direction whether, when the terminals 51 and the first end portions 29a of the coils 29, which will be described below, have been soldered to the inverter board 40, the solders 30 and 31 have properly spread onto the second principal surface of the inverter board 40, that is, whether the soldering has been satisfactorily accomplished.

Each rib portion 17f is arranged to project to the first axial side from one of the principal surfaces of the bottom wall portion 17a which faces to the first axial side, and is arranged to extend along an imaginary plane (not shown) perpendicular to the central axis J. The number of rib portions 17f is more than one. The rib portions 17f are arranged to extend in a radial manner with the central axis J as a center. In the present example embodiment, the rib portions 17f include a rib portion 17f arranged to extend in a radial direction, and a rib portion 17f arranged to extend in a non-radial direction when viewed in the axial direction. The rib portions 17f are arranged apart from one another in the circumferential direction. A radially outer end portion of each rib portion 17f is joined to the lateral wall portion 17b. An end surface of the rib portion 17f which faces to the first axial side is arranged on the second axial side of an end surface of the lateral wall portion 17b which faces to the first axial side.

The pin portion 71 is arranged to extend in the axial direction. The pin portion 71 is arranged to extend to the first axial side from the bottom wall portion 17a. In the present example embodiment, the pin portion 71 is defined integrally with one of the rib portions 17f. That is, the pin portion 71 and the one of the rib portions 17f define a portion of a single monolithic member. The pin portion 71 is arranged between a radially inner end portion and a radially outer end portion of the one of the rib portions 17f.

The pin portion 71 is inserted into a positioning hole portion 43, which will be described below, of the inverter board 40. An end portion of the pin portion 71 on the first axial side is inserted into the positioning hole portion 43. The end portion of the pin portion 71 on the first axial side is arranged to project to the first axial side relative to the end surface of each support portion 12g on the first axial side. The pin portion 71 is arranged opposite to at least one of the support portions 12g with a gap therebetween when viewed in the axial direction. That is, the pin portion 71 is arranged close to at least one of the support portions 12g with a gap therebetween when viewed in the axial direction. The pin portion 71 is arranged to decrease in a stepwise manner in outside diameter from the bottom wall portion 17a toward the first axial side. According to the present example embodiment, positioning of the inverter board 40 and the inverter housing portion 13 relative to each other can be achieved by the pin portion 71 being inserted into the positioning hole portion 43 of the inverter board 40. This contributes to restraining the inverter board 40 from turning together with any screw member 60, and preventing the inverter board 40 from rotating with respect to the inverter housing portion 13, when the inverter board 40 is fixed to the support portions 12g through the screw members 60.

The boss portion 17j is arranged to project to the first axial side from the bottom wall portion 17a. The boss portion 17j is arranged to extend in the axial direction. The boss portion 17j is tubular or columnar. In the present example embodiment, the boss portion 17j is in the shape of a hollow cylinder. A top surface of the boss portion 17j, which faces to the first axial side, is flat and perpendicular to the central axis J. The top surface of the boss portion 17j is arranged to be in contact with the second principal surface of the inverter board 40, or opposite to the second principal surface of the inverter board 40 with a gap therebetween. The boss portion 17j is arranged to be capable of supporting the second principal surface of the inverter board 40. The boss portion 17j is arranged at a central portion of the inverter board 40 in the plan view of the inverter board 40. The bearing holder 17c and the boss portion 17j are arranged to overlap with each other in the plan view of the inverter board 40.

The insert hole 17k is recessed to the first axial side from a surface of the bottom wall portion 17a which faces to the second axial side. The insert hole 17k is arranged to extend in the axial direction. The insert hole 17k is arranged to overlap with each of the shank portion fitting hole 12m and the shank portion 33 when viewed in the axial direction. The shank portion 33 is inserted into the insert hole 17k. According to the present example embodiment, radial positioning of the second member 17 with respect to the motor housing portion 12 is achieved by the fitting tubular portion 17d being fitted inside of the housing tubular portion 12a. In addition, circumferential positioning of the second member 17 with respect to the motor housing portion 12 is achieved by the shank portion 33 being inserted into the insert hole 17k. Thus, relative positions of the motor housing portion 12 and the inverter housing portion 13 are stably fixed, making it easier to connect the terminals 51 and the first end portions 29a of the coils 29, which will be described below, to the inverter board 40. In addition, the shank portion 33 and the pin portion 71 are arranged to overlap with each other when viewed in the axial direction. According to the present example embodiment, the shank portion 33 and the pin portion 71 are arranged coaxially, reducing a space for a positioning structure using the shank portion 33 and the pin portion 71.

The breather housing wall portion 17l is recessed to the first axial side from the surface of the bottom wall portion 17a which faces to the second axial side. The breather housing wall portion 17l is tubular and has a top. The breather housing wall portion 17l includes a lateral wall and a top wall. The lateral wall of the breather housing wall portion 17l is arranged to extend to the first axial side from the bottom wall portion 17a. The top wall of the breather housing wall portion 17l is arranged to close an opening of the lateral wall of the breather housing wall portion 17l on the first axial side. The breather housing wall portion 17l is arranged to overlap with the breather fitting hole 12i when viewed in the axial direction. Each or at least one of the tubular portion arrangement holes 17m is arranged to pass through the bottom wall portion 17a in the axial direction. Extension tubular portions 85b, which will be described below, of the coil support 80 are arranged in the tubular portion arrangement holes 17*m*.

The lateral wall portion 17*b* is tubular, and is arranged to extend to the first axial side from an outer circumferential portion of the bottom wall portion 17*a*. In the present example embodiment, the lateral wall portion 17*b* is substantially in the shape of a polygonal tube. The lateral wall portion 17*b* includes spacers 17*h* and the connector portion 17*i*. That is, the inverter housing portion 13 includes the connector portion 17*i*.

Each spacer 17*h* is tubular, and is arranged to extend in the axial direction. In the present example embodiment, the spacer 17*h* is in the shape of a hollow cylinder. The spacer 17*h* is arranged in the lateral wall portion 17*b*, and is arranged to pass through the second member 17 in the axial direction. The number of spacers 17*h* is more than one. The spacers 17*h* are arranged apart from one another in the circumferential direction. Each spacer 17*h* is arranged to have one of the fastening screws 18 inserted therethrough. The spacer 17*h* is made of a metal. When the second member 17 is defined by the injection molding process, each spacer 17*h* is placed in the mold (not shown) together with other metal parts. The molten resin is filled into this mold and is hardened therein, so that the second member 17 is defined together with the spacers 17*h* by the insert molding process.

An external power supply (not shown) is connected to the connector portion 17*i*. The connector portion 17*i* is tubular. In the present example embodiment, the connector portion 17*i* is in the shape of a quadrilateral tube. The connector portion 17*i* is arranged to extend outward from the lateral wall portion 17*b* when viewed in the axial direction. The connector portion 17*i* is arranged to project outward from the lateral wall portion 17*b* along the imaginary plane (not shown) perpendicular to the central axis J. In the present example embodiment, a direction in which the connector portion 17*i* projects from the lateral wall portion 17*b* will sometimes be referred to as a projecting direction. A forward side in the projecting direction of the connector portion 17*i* corresponds to a +x side. A rearward side in the projecting direction corresponds to a −x side. In addition, a direction perpendicular to the projecting direction when viewed in the axial direction will sometimes be referred to as a width direction. The width direction corresponds to a y-axis direction. The connector portion 17*i* is arranged at a position different from that of the central axis J in the width direction. In the width direction, a side on which the connector portion 17*i* lies with respect to the central axis J is referred to as a first widthwise side (or a +y side), while a side on which the central axis J lies with respect to the connector portion 17*i* is referred to as a second widthwise side (or a −y side).

The connector portion 17*i* and the lateral wall portion 17*b* define a portion of a single monolithic member. A portion of each wiring member 50 is arranged in an interior of the connector portion 17*i*. The connector portion 17*i* is fixed to the wiring members 50. The connector portion 17*i* is arranged to hold the wiring members 50.

The wiring member arrangement region 13*a* is a space in which the wiring members 50 are arranged in the inverter housing portion 13. In an interior space of the inverter housing portion 13, the wiring member arrangement region 13*a* is arranged between the central axis J and the connector portion 17*i* in the projecting direction in the plan view of the inverter board 40. That is, the wiring member arrangement region 13*a* is arranged between the central axis J and the connector portion 17*i* when viewed in the axial direction. The wiring member arrangement region 13*a* is arranged on the forward side in the projecting direction (i.e., on the +x side) of the central axis J, and on the rearward side in the projecting direction (i.e., on the −x side) of the connector portion 17*i*.

The coil support housing space 13*b* is arranged in the interior of the inverter housing portion 13. The coil support housing space 13*b* is arranged to house the coil support 80. The coil support housing space 13*b* is a space in which the coil support 80 is arranged in the interior space of the inverter housing portion 13. The coil support housing space 13*b* is annular, and is centered on the central axis J. The coil support housing space 13*b* is arranged to overlap with the stator 26 when viewed in the axial direction. The coil support housing space 13*b* is arranged radially inside of the fitting tubular portion 17*d*. The coil support housing space 13*b* is a groove-shaped space extending in the circumferential direction, and recessed to the first axial side from the surface of the bottom wall portion 17*a* which faces to the second axial side.

Each thermally conductive sheet 13*c* is plate-shaped, having a pair of principal surfaces facing in the axial direction. The thermally conductive sheet 13*c* is an elastic sheet member. The thermally conductive sheet 13*c* is, for example, in the shape of a quadrilateral plate. The thermally conductive sheet 13*c* is arranged between the inverter board 40 and one of the first member 16 and the second member 17, and is arranged to be in contact with the inverter board 40 and one of the first member 16 and the second member 17. In the present example embodiment, each thermally conductive sheet 13*c* is arranged between the first member 16 and the inverter board 40, and is arranged to be in contact with the first member 16 and the inverter board 40. Specifically, the thermally conductive sheet 13*c* is arranged between the top wall 16*a* and the first principal surface of the inverter board 40, and is arranged to be in contact with the top wall 16*a* and the first principal surface of the inverter board 40. Although no illustration is provided, in the case where the thermally conductive sheet 13*c* is arranged between the second member 17 and the inverter board 40, and is arranged to be in contact with the second member 17 and the inverter board 40, the thermally conductive sheet 13*c* is arranged between, for example, a metal portion (i.e., a metal member) (not shown) included in the bottom wall portion 17*a* and the second principal surface of the inverter board 40, and is arranged to be in contact with, for example, the metal portion of the bottom wall portion 17*a* and the second principal surface of the inverter board 40. The thermally conductive sheet 13*c* is thermally connected to a heat-generating element 46, which will be described below, on the inverter board 40. The thermally conductive sheet 13*c* has a function of transferring a heat of the heat-generating element 46 to another member through heat conduction to cool the heat-generating element 46. Other features and advantageous effects of the thermally conductive sheet 13*c* will be described below together with a description of the inverter board 40.

The breather portion 14 is arranged to bring an interior of the housing 11 into communication with a space outside of the housing 11. The breather portion 14 is provided on the collar portion 12*b* of the motor housing portion 12, and is exposed from the housing 11 to an outside of the apparatus toward the second axial side. That is, the breather portion 14 is arranged on the collar portion 12*b*. The collar portion 12*b* is covered by the inverter housing portion 13 on the first axial side, and is arranged to face to the second axial side, i.e., toward a member of the vehicle (not shown) to which the electric pump apparatus 1 is fixed. Thus, the collar portion 12*b* is covered on both axial sides by the inverter housing portion 13 and the member of the vehicle. According to the present example embodiment, a reduction in the likelihood that water drops or the like scattered due to travel of the vehicle, for example, will directly splash on the breather portion 14 can be achieved. This makes it less likely for water or the like to touch a member inside of the housing 11, and leads to maintaining functions of the inverter board 40, the motor 20, and so on in good conditions.

The breather portion 14 is arranged not to overlap with leg portions 97, which will be described below, of the pump cover 95 when viewed in the axial direction. According to the present example embodiment, it is easy to perform, for example, an operation of checking a sealing function of the housing 11 through an area at which the breather portion 14 is fitted, i.e., through the breather fitting hole 12*i* of the collar portion 12*b*, since the breather portion 14 does not overlap with any leg portion 97 when viewed in the axial direction. That is, it is easy to fit and remove a jig of an inspection device (not shown) or the like into and from the breather fitting hole 12*i*. In addition, it is easy to fit the breather portion 14 into the breather fitting hole 12*i* after the checking.

The breather portion 14 is arranged at a position overlapping with the wiring member arrangement region 13*a* when viewed in the axial direction on the collar portion 12*b*. In the present example embodiment, the breather portion 14 is arranged on the second widthwise side (i.e., the −y side) of the central axis J in the wiring member arrangement region 13*a*. Note that the breather portion 14 may alternatively be arranged on the first widthwise side (i.e., the +y side) of the central axis J in the wiring member arrangement region 13*a*. It is relatively easy to secure a wide space for the wiring member arrangement region 13*a*, because the wiring members 50 are housed in the wiring member arrangement region 13*a*. According to the present example embodiment, since the breather portion 14 is arranged at a position overlapping with the wiring member arrangement region 13*a* when viewed in the axial direction on the collar portion 12*b*, a free space of the housing 11 can be effectively employed to optimize the arrangement of constituent members of the apparatus to achieve a reduction in size of the electric pump apparatus 1.

Although no illustration is provided, the breather portion 14 is arranged on an upper side of a center of the electric pump apparatus 1 in a vertical direction in a situation in which the electric pump apparatus 1 has been attached to the member of the vehicle. This arrangement reduces the possibility that the breather portion 14 will be immersed in water or the like. In addition, it can thus be made easier to discharge a high-temperature air inside of the housing 11 out of the apparatus through the breather portion 14. The arrangement of the breather portion 14 on the upper side of the center of the electric pump apparatus 1 in the vertical direction can also be explained using a relative positional relationship between an inflow port 96*a* and an outflow port 96*b*, which will be described below, of the pump cover 95. This explanation will be provided below together with a description of the pump cover 95.

The breather portion 14 includes a breather body 14*a*, a breather tubular portion 14*b*, claw portions 14*c*, and a breather seal member 14*e*. The breather body 14*a* is disk-shaped, and has an interior space. A central axis of the breather body 14*a* will be hereinafter referred to as the breather central axis C. The breather central axis C extends parallel to the central axis J, that is, extends in the axial direction. The radial directions centered on the breather central axis C are referred to as the breather radial directions. A side closer to the breather central axis C in a breather radial direction is referred to as an inner side in the breather radial direction, while a side away from the breather central axis C in a breather radial direction is referred to as an outer side in the breather radial direction. A circumferential direction about the breather central axis C, i.e., a direction encircling the breather central axis C, is referred to as a breather circumferential direction.

A surface of the breather body 14*a* which faces to the first axial side is arranged axially opposite to the bottom surface of the breather housing recessed portion 12*j*, which faces to the second axial side, with a gap therebetween. An outer circumferential surface of the breather body 14*a* is arranged opposite to an inner circumferential surface of the breather housing recessed portion 12*j* in the breather radial directions with a gap therebetween. The breather body 14*a* includes a portion housed inside of the breather housing recessed portion 12*j*.

The breather body 14*a* includes breathing holes 14*d*. Each breathing hole 14*d* is arranged to be in communication with the space outside of the housing 11. The breathing hole 14*d* is arranged to be in communication with the interior space of the breather body 14*a*. The breathing holes 14*d*, the number of which is more than one, are arranged apart from one another in the breather circumferential direction. The breathing holes 14*d* include a breathing hole 14*d* arranged to extend in a breather radial direction, and a breathing hole 14*d* arranged to extend in the axial direction. The breathing holes 14*d* include a breathing hole 14*d* arranged to open in the outer circumferential surface of the breather body 14*a*, and a breathing hole 14*d* arranged to open in the surface of the breather body 14*a* which faces to the first axial side.

The breather tubular portion 14*b* is tubular, and is arranged to extend in the axial direction. The breather tubular portion 14*b* is joined to the breather body 14*a*. The breather tubular portion 14*b* is joined to the surface of the breather body 14*a* which faces to the first axial side, and is arranged to extend to the first axial side from the breather body 14*a*. The breather tubular portion 14*b* is inserted into the breather fitting hole 12*i*. A space inside of the breather tubular portion 14*b* is arranged to be in communication with the breathing holes 14*d* through the interior space of the breather body 14*a*. That is, the space inside of the breather tubular portion 14*b* is arranged to be in communication with the breathing holes 14*d*. The space inside of the breather tubular portion 14*b* is arranged to be in communication with the interior of the inverter housing portion 13 through the through holes 17*e* of the bottom wall portion 17*a* and so on. That is, the space inside of the breather tubular portion 14*b* is arranged to be in communication with the interior of the housing 11.

Each of the claw portions 14*c* is arranged to extend outward in a breather radial direction from an end portion of the breather tubular portion 14*b* on the first axial side. The claw portions 14*c*, the number of which is more than one, are arranged apart from one another in the breather circumferential direction. Each claw portion 14*c* is arranged to touch the collar portion 12*b* from the first axial side. The claw portion 14*c* is arranged to touch the claw portion support surface 12*k* of the collar portion 12*b* from the first axial side. That is, the claw portions 14*c* are arranged to be in contact with the claw portion support surface 12*k*. Each claw portion 14*c* is engaged with the claw portion support surface 12*k* through, for example, a snap-fit structure. According to the present example embodiment, the claw portion support surface 12*k* can be easily processed using a cutting tool or the like, since the claw portion support surface 12k is arranged on the first axial side relative to the surrounding surface 12l. Thus, a proper axial position of the claw portion support surface 12k and a sufficient accuracy in the processing of the claw portion support surface 12k can be ensured. In addition, each claw portion 14c can be brought into stable engagement with the claw portion support surface 12k. Further, the breather portion 14 can be fixed to the collar portion 12b with increased stability.

Here, the breather housing wall portion 17l is arranged to house the end portion of the breather tubular portion 14b on the first axial side and the claw portions 14c, and cover the breather tubular portion 14b on the first axial side. The top wall of the breather housing wall portion 17l is arranged opposite to the end portion of the breather tubular portion 14b on the first axial side and the claw portions 14c with a gap therebetween on the first axial side. The lateral wall of the breather housing wall portion 17l is arranged opposite to the end portion of the breather tubular portion 14b on the first axial side and the claw portions 14c with a gap therebetween on the outer side in the breather radial directions. According to the present example embodiment, even if water or the like intrudes from outside the apparatus into the interior of the housing 11 through the breather portion 14, the breather housing wall portion 17l serves to prevent the water or the like from directly splashing on an electronic component or the like inside of the housing 11.

The breather seal member 14e is, for example, an O ring or the like. The breather seal member 14e is arranged to be in contact with an outer circumferential surface of the breather tubular portion 14b, the surface of the breather body 14a which faces to the first axial side, and the wall surface of the breather fitting hole 12i. According to the present example embodiment, the breather seal member 14e serves to prevent water or the like from intruding into the interior of the housing 11 through a gap between the breather tubular portion 14b and the wall surface of the breather fitting hole 12i. In addition, the breather portion 14 can thus be fitted to the collar portion 12b with increased stability.

The motor 20 includes a rotor 21, the stator 26, and the plurality of bearings 35 and 36. The rotor 21 includes the shaft 22, the rotor core 23, magnets 24, and a magnet holder 25.

The shaft 22 is arranged to extend along the central axis J. The shaft 22 is arranged to extend in the axial direction with the central axis J in a center. The shaft 22 is arranged to rotate about the central axis J. The shaft 22 is supported by the bearings 35 and 36 to be rotatable about the central axis J. That is, the bearings 35 and 36 are arranged to rotatably support the shaft 22. Each of the bearings 35 and 36 is, for example, a ball bearing or the like. Of the bearings 35 and 36, the first bearing 35 is arranged to support a portion of the shaft 22 which lies on the second axial side of the rotor core 23. Of the bearings 35 and 36, the second bearing 36 is arranged to support a portion of the shaft 22 which lies on the first axial side of the rotor core 23.

The rotor core 23 is fixed to an outer circumferential surface of the shaft 22. The rotor core 23 is annular, and is arranged to extend in the circumferential direction about the central axis J. The rotor core 23 is annular, and is arranged to extend in the axial direction. The rotor core 23 is, for example, defined by a plurality of electromagnetic steel sheets placed one upon another in the axial direction.

The magnets 24 are arranged on a radially outer surface of the rotor core 23. The number of magnets 24 is more than one. The magnets 24 are arranged apart from one another in the circumferential direction on the radially outer surface of the rotor core 23. Note that a single ring magnet in the shape of a hollow cylinder, for example, may alternatively be used instead of the magnets 24.

The magnet holder 25 is arranged on the rotor core 23 to hold the magnets 24. The magnet holder 25 is arranged to fix the magnets 24 to the rotor core 23. The magnet holder 25 is arranged on the radially outer surface of the rotor core 23 and a surface of the rotor core 23 which faces to the second axial side. The magnet holder 25 is arranged to hold the magnets 24 from the radially outer side and the second axial side. The magnet holder 25 includes portions each of which is arranged to extend in the axial direction between circumferentially adjacent ones of the magnets 24, and an annular portion centered on the central axis J and arranged on the second axial side of the magnets 24.

The stator 26 is arranged radially outside of the rotor 21, and is arranged radially opposite to the rotor 21 with a gap therebetween. That is, the stator 26 is arranged radially opposite to the rotor 21. The stator 26 is arranged to surround the rotor 21 from radially outside over the entire circumferential extent of the rotor 21. The stator 26 includes a stator core 27, an insulator 28, and the coils 29.

The stator core 27 is annular, and is centered on the central axis J. The stator core 27 is arranged to surround the rotor 21 on the radially outer side of the rotor 21. The stator core 27 is arranged radially outside of the rotor 21, and is arranged radially opposite to the rotor 21 with a gap therebetween. The stator core 27 is, for example, defined by a plurality of electromagnetic steel sheets placed one upon another in the axial direction.

The stator core 27 includes a core back 27a and a plurality of teeth 27b. The core back 27a is annular, and is centered on the central axis. The core back 27a is tubular, and is arranged to extend in the axial direction. A radially outer surface of the core back 27a is fixed to an inner circumferential surface of the housing tubular portion 12a. The teeth 27b are arranged to extend radially inward from a radially inner surface of the core back 27a. The teeth 27b are arranged apart from one another in the circumferential direction on the radially inner surface of the core back 27a. Radially inner surfaces of the teeth 27b are arranged radially outside of and opposite to radially outer surfaces of the magnets 24 with a gap therebetween.

The insulator 28 is attached to the stator core 27. The insulator 28 includes portions arranged to cover the teeth 27b. A material of the insulator 28 is an insulating material such as, for example, a resin. Each coil 29 is fitted on the stator core 27. The coil 29 is attached to the stator core 27 with the insulator 28 therebetween. Each of the coils 29 is defined by a conducting wire wound around a separate one of the teeth 27b with the insulator 28 therebetween.

Although no illustration is provided, the coils 29 include a first coil and a second coil. The first coil includes a first conducting wire. The second coil includes a second conducting wire different from the first conducting wire. That is, the first coil and the second coil are different from each other in phase. In the present example embodiment, the motor 20 is a three-phase motor. Three phases of the motor 20 are a U phase, a V phase, and a W phase. In the case of the three-phase motor, conducting wires defining the coils 29 of the respective phases, the U phase, the V phase, and the W phase, are different from one another. That is, the conducting wire of the coil 29 of the U phase, the conducting wire of the coil 29 of the V phase, and the conducting wire of the coil 29 of the W phase are different from one another. In the case where the first coil corresponds to the U phase, for example, the second coil corresponds to one of the V phase and the W phase. In the case where the second coil corresponds to the U phase, the first coil corresponds to one of the V phase and the W phase.

The coils 29 have a pair of end portions drawn out from the coils 29 at both end portions of each of the conducting wires of the coils 29. The pair of end portions are a first end portion 29a and a second end portion 29b. The end portions 29a and 29b of each of the conducting wires of the coils 29 may alternatively be referred to as drawn-out portions of the coils 29. The first end portion 29a is directly connected to the inverter board 40. The second end portion 29b is connected to a neutral point busbar 81, which will be described below, of the coil support 80.

Figure 9:
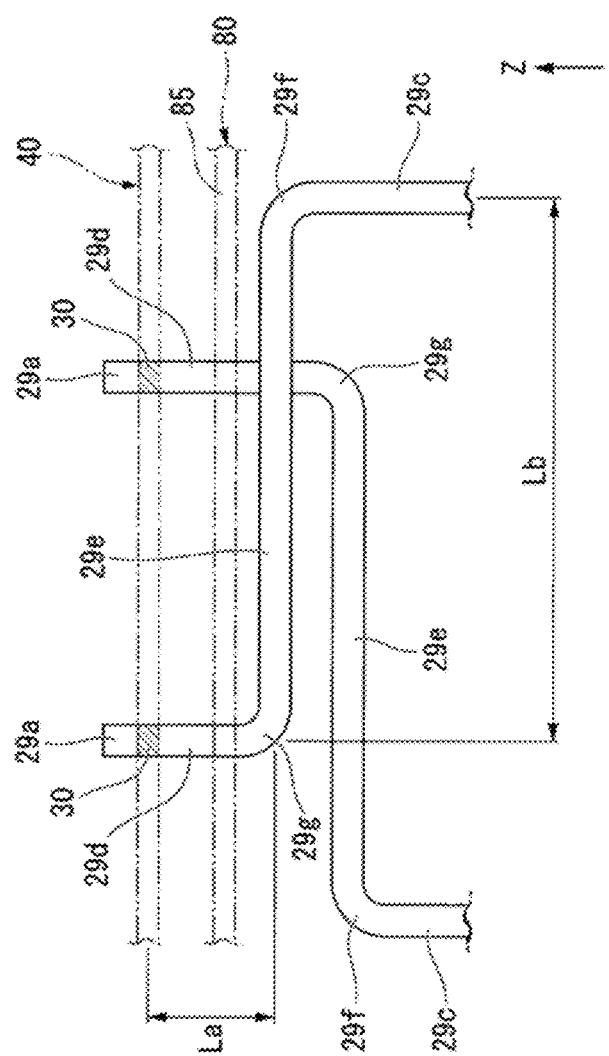
FIG. 9 is a side view schematically illustrating first end portions of coils according to an example embodiment of the present disclosure and their vicinity.

The first end portion 29a includes a first extending portion 29c, a second extending portion 29d, and a third extending portion 29e (see FIG. 9). The first extending portion 29c is arranged to extend to the first axial side from the corresponding coil 29. The second extending portion 29d is connected to the inverter board 40, and is arranged to extend in the axial direction. The second extending portion 29d is joined to the inverter board 40 using the solder 30. The third extending portion 29e is arranged to join an end of the first extending portion 29c on the first axial side and an end of the second extending portion 29d on the second axial side to each other, and is arranged to extend in a direction that is not parallel to the central axis J. That is, in the present example embodiment, the first end portion 29a of the coils 29 includes a plurality of bend portions 29f and 29g. Specifically, the first end portion 29a includes a bend portion 29f arranged at a junction of the first extending portion 29c and the third extending portion 29e, and a bend portion 29g arranged at a junction of the second extending portion 29d and the third extending portion 29e. Thus, when a vibration has been transferred to the first extending portion 29c from outside or inside of the apparatus, the vibration is attenuated while the vibration is transferred from the first extending portion 29c to the second extending portion 29d through the third extending portion 29e. Specifically, the vibration is transferred to the inverter board 40 with a reduction in the amplitude of at least an axial component of the vibration. Thus, a reduction in a load on the solder 30 joining the second extending portion 29d to the inverter board 40 is achieved, leading to an improved durability of the solder 30.

In the first end portion 29a, a length Lb of the third extending portion 29e is longer than a length La of a portion of the second extending portion 29d which extends between the inverter board 40 and the third extending portion 29e. According to the present example embodiment, an improvement in an effect of attenuating a vibration can be achieved at the first end portion 29a of the coils 29. An additional improvement in the durability of the solder 30, which joins the first end portion 29a and the inverter board 40 to each other, is achieved.

Two of the first end portions 29a illustrated in FIG. 9 are a first end portion 29a of the first coil, and a first end portion 29a of the second coil. That is, the two first end portions 29a illustrated in FIG. 9 are different in phase. The third extending portion 29e of the first coil and the third extending portion 29e of the second coil are arranged to overlap with each other when viewed in the axial direction, and the third extending portion 29e of the first coil and the third extending portion 29e of the second coil are arranged apart from each other in the axial direction. According to the present example embodiment, since the two third extending portions 29e are arranged to overlap with each other when viewed in the axial direction, the distance over which each of the first end portions 29a is routed in a direction that is not parallel to the central axis J can be shortened, and a reduction in the likelihood of an axial contact between the first end portions 29a which are different in phase can be achieved. Thus, performance of the motor 20 can be maintained in a good condition.

The inverter board 40 is arranged on the first axial side of the motor 20. The inverter board 40 is electrically connected to the external power supply (not shown) through the wiring members 50. The inverter board 40 is electrically connected to the motor 20. The inverter board 40 is arranged to supply power supplied from the external power supply to the stator 26 of the motor 20. The inverter board 40 is arranged to control supply of an electric current to the motor 20.

The inverter board 40 is polygonal in the plan view of the inverter board 40, and includes a plurality of corner portions 45a, 45b, . . . . In the present example embodiment, the inverter board 40 is substantially pentagonal in the plan view of the inverter board 40, and the inverter board 40 has five corner portions 45a, 45b, . . . . In the present example embodiment, of the plurality of corner portions 45a, 45b, . . . , the corner portion which lies, in the plan view of the inverter board 40, on the first widthwise side (i.e., the +y side) and on the forward side in the projecting direction (i.e., on the +x side) in the inverter board 40 is referred to as a first corner portion 45a. The first corner portion 45a lies on the first widthwise side of the central axis J and on the forward side in the projecting direction of the central axis J. In addition, a second corner portion 45b is one of the corner portions that lies, in the plan view of the inverter board 40, on the second widthwise side (i.e., the −y side) and on the rearward side in the projecting direction (i.e., on the −x side) in the inverter board 40. The second corner portion 45b lies on the second widthwise side of the central axis J and on the rearward side in the projecting direction of the central axis J. A third corner portion is one of the corner portions that lies, in the plan view of the inverter board 40, on the second widthwise side of the central axis J and on the forward side in the projecting direction of the central axis J. A fourth corner portion and a fifth corner portion lie, in the plan view of the inverter board 40, on the first widthwise side of the central axis J and on the rearward side in the projecting direction of the central axis J.

The inverter board 40 includes a plurality of heat-generating elements 46, capacitors 47, drawn-out portion insert holes 48, terminal insert holes 41, screw insert holes 42, and the positioning hole portion 43. In addition, the inverter board 40 includes a coil connection region 40a and a terminal connection region 40b. The heat-generating elements 46 are mounted on the inverter board 40, and are arranged apart from one another. Each of the heat-generating elements 46 is, for example, a field-effect transistor (FET), a pre-driver, a low drop-out regulator (LDO), or the like. In the present example embodiment, each heat-generating element 46 is arranged on the second principal surface of the inverter board 40.

Here, the thermally conductive sheets 13c will now be described below. In the present example embodiment, the number of thermally conductive sheets 13c is more than one. That is, the inverter housing portion 13 includes a plurality of thermally conductive sheets 13c. The thermally conductive sheets 13c are arranged individually at positions overlapping with the respective heat-generating elements 46 in the plan view of the inverter board 40. In the present example embodiment, each thermally conductive sheet 13c is arranged to overlap with one of the heat-generating elements 46 in the plan view of the inverter board 40. That is, each one of the thermally conductive sheets 13c is arranged to overlap with one of the heat-generating elements 46. The thermally conductive sheets 13*c* and the heat-generating elements 46 are arranged to overlap in a one-to-one relationship when viewed in the axial direction.

For example, compared to a configuration in which one thermally conductive sheet having a large area is arranged to be in contact with all the heat-generating elements 46, the above configuration of the present example embodiment allows positions at which the thermally conductive sheets 13*c* are in contact with the inverter board 40 to be dispersed, and is able to achieve a reduced total area of contact therebetween. This leads to a reduction in reaction force of the thermally conductive sheets 13*c*, reducing the likelihood of a deformation of the inverter board 40. Then, performance or the like of an electronic component, such as, for example, a ceramic capacitor or the like, mounted on the inverter board 40 can be maintained in a good condition. Further, an additional improvement in the durability of the solder 30, which joins each of the first end portions 29*a* of the coils 29 to the inverter board 40, is achieved. An additional increase in the durability of the solder 31, which joins each of the terminals 51, which will be described below, of the wiring members 50 to the inverter board 40, is achieved.

Figure 10:
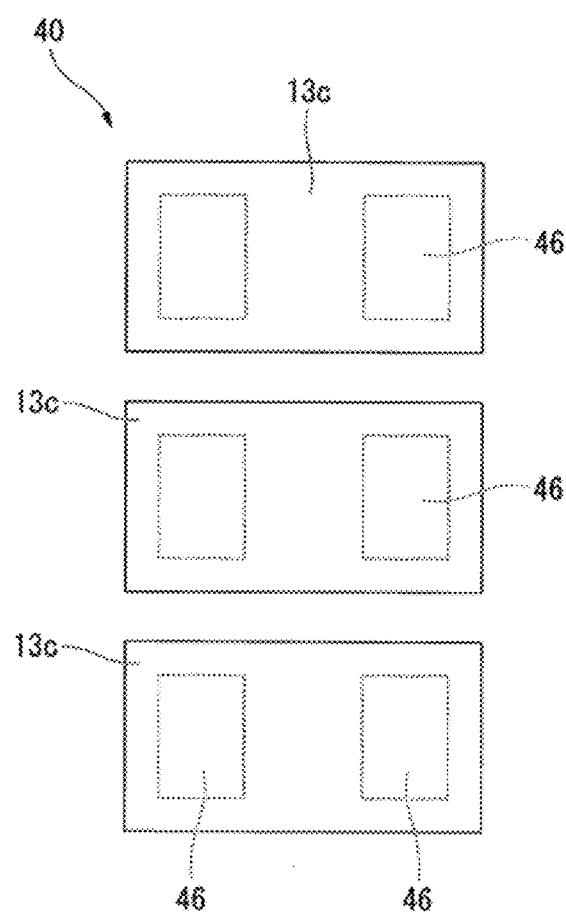
FIG. 10 is a plan view of thermally conductive sheets according to a modification of the above example embodiment of the present disclosure.

Here, FIG. 10 illustrates thermally conductive sheets 13*c* according to a modification of the present example embodiment. In this modification, each thermally conductive sheet 13*c* is arranged to overlap with two of the heat-generating elements 46 in the plan view of the inverter board 40. That is, each one of the thermally conductive sheets 13*c* is arranged to overlap with two of the heat-generating elements 46. Also in this case, positions at which the thermally conductive sheets 13*c* are in contact with the inverter board 40 are dispersed, and a reduction in the total area of contact therebetween is achieved, reducing the likelihood of a deformation of the inverter board 40.

At least one of the thermally conductive sheets 13*c* is arranged between the first member 16 and the inverter board 40, and is arranged to be in contact with both the first member 16 and the inverter board 40. In the present example embodiment, all of the thermally conductive sheets 13*c* are arranged between the first member 16 and the inverter board 40, and are arranged to be in contact with both the first member 16 and the inverter board 40. According to the present example embodiment, the thermally conductive sheets 13*c* are brought into contact with the inverter board 40 when the second member 17 is fitted to the motor housing portion 12 and then the first member 16 is fitted to the second member 17, that is, when assembly of the inverter housing portion 13 is finished. When the thermally conductive sheets 13*c* are brought into contact with the inverter board 40, the inverter board 40 can be supported from both axial sides between the first member 16 and the second member 17, which contributes to further reducing the likelihood of a deformation of the inverter board 40.

According to the present example embodiment, when the first member 16 is fitted to the second member 17, causing the thermally conductive sheets 13*c* to press the first principal surface of the inverter board 40, the boss portion 17*j* supports the second principal surface of the inverter board 40. This further reduces the likelihood of a deformation of the inverter board 40. In addition, in the present example embodiment, the boss portion 17*j* is supported in the axial direction by the bearing holder 17*c* made of the metal. Thus, the inverter board 40 is stably supported by the boss portion 17*j*, further reducing the likelihood of a deformation of the inverter board 40.

Note that, although no illustration is provided, at least one of the thermally conductive sheets 13*c* may alternatively be arranged between the second member 17 and the inverter board 40, and arranged to be in contact with both the second member 17 and the inverter board 40.

The capacitors 47 are arranged on the second principal surface of the inverter board 40. Each capacitor 47 is arranged to extend to the second axial side from the second principal surface of the inverter board 40. In the present example embodiment, the number of capacitors 47 is more than one. Each capacitor 47 is arranged to overlap with the coil support 80 when viewed in the axial direction.

Each drawn-out portion insert hole 48 is arranged to pass through the inverter board 40 in a thickness direction thereof (i.e., in the axial direction). That is, the drawn-out portion insert hole 48 is arranged to pass through the inverter board 40. The number of drawn-out portion insert holes 48 is more than one. In the present example embodiment, the drawn-out portion insert holes 48 are arranged in a straight line in the plan view of the inverter board 40. The drawn-out portion insert holes 48 are arranged in the projecting direction in an end portion of the inverter board 40 on the second widthwise side. Each drawn-out portion insert hole 48 is arranged to have one of the first end portions 29*a* of the coils 29 inserted therein. Each of the first end portions 29*a* of the coils 29 is joined to the inverter board 40 through the solder 30.

Each terminal insert hole 41 is arranged to pass through the inverter board 40 in the thickness direction thereof. That is, the terminal insert hole 41 is arranged to pass through the inverter board 40. The number of terminal insert holes 41 is more than one. In the present example embodiment, the terminal insert holes 41 are arranged in a straight line in the plan view of the inverter board 40. The terminal insert holes 41 are arranged in the width direction (i.e., the y-axis direction) in an end portion of the inverter board 40 on the forward side in the projecting direction (i.e., on the +x side). The terminal insert holes 41 are arranged in the first corner portion 45*a*. In other words, one of the plurality of corner portions 45*a*, 45*b*, . . . of the inverter board 40 in which the terminal insert holes 41 are arranged is the first corner portion 45*a*. Each terminal insert hole 41 is arranged to have one of the terminals 51, which will be described below, of the wiring members 50 inserted therein. Each terminal 51 is joined to the inverter board 40 through the solder 31.

Each screw insert hole 42 is arranged to pass through the inverter board 40 in the thickness direction thereof. That is, the screw insert hole 42 is arranged to pass through the inverter board 40. Each screw insert hole 42 is arranged to overlap with the female screw portion of the corresponding support portion 12*g* in the plan view of the inverter board 40, that is, when viewed in the axial direction. The number of screw insert holes 42 defined in the inverter board 40 is more than one. Each screw insert hole 42 is arranged to overlap with the female screw portion of a separate one of the support portions 12*g* when viewed in the axial direction.

The screw insert holes 42 are arranged in the corner portions 45*a*, 45*b*, . . . of the inverter board 40. At least one of the screw insert holes 42 is arranged in the first corner portion 45*a*. In the present example embodiment, two of the screw insert holes 42 are arranged in the first corner portion 45*a*. In the plan view of the inverter board 40, the terminal insert holes 41 are arranged between the two screw insert holes 42 in the first corner portion 45*a*. The terminal insert holes 41 are arranged between the two screw insert holes 42 in the width direction.

The positioning hole portion 43 is arranged to pass through the inverter board 40 in the thickness direction thereof. That is, the positioning hole portion 43 is arranged to pass through the inverter board 40 in the axial direction. In the present example embodiment, only one positioning hole portion 43 is defined in the inverter board 40. The positioning hole portion 43 is arranged in a corner portion of the inverter board 40 in the plan view of the inverter board 40. The positioning hole portion 43 is arranged in the first corner portion 45a. The positioning hole portion 43 is arranged between the terminal insert holes 41 and an outer edge surface of the inverter board 40 in the plan view of the inverter board 40. In the present example embodiment, the positioning hole portion 43 is arranged between the terminal insert holes 41 and an outer edge surface of the inverter board 40 which faces to the first widthwise side in the width direction.

In the plan view of the inverter board 40, the positioning hole portion 43 is arranged opposite to that one of the two screw insert holes 42 defined in the first corner portion 45a which lies on the first widthwise side of the terminal insert holes 41 in the projecting direction with a gap therebetween. That is, in the plan view of the inverter board 40, the positioning hole portion 43 and the screw insert hole 42 defined in the first corner portion 45a are arranged opposite to each other with a gap therebetween.

The coil connection region 40a is a region in which the end portions 29a of the coils 29 are connected to the inverter board 40. In the present example embodiment, the coil connection region 40a is arranged on the second widthwise side (i.e., the −y side) of the central axis J in the plan view of the inverter board 40. Two or more of the heat-generating elements 46 are arranged in the coil connection region 40a. Specifically, two or more heat-generating elements, such as, for example, an FET and so on, are arranged in the coil connection region 40a. According to the present example embodiment, the end portions 29a of the coils 29 connected to the inverter board 40 are arranged close to the heat-generating elements 46, and this contributes to shortening the wiring pattern of the inverter board 40. In addition, each of the heat-generating elements can be efficiently cooled individually through the corresponding thermally conductive sheet 13c.

The terminal connection region 40b is a region in which the terminals 51, which will be described below, of the wiring members 50 are connected to the inverter board 40. In the present example embodiment, the terminal connection region 40b is arranged on the first widthwise side (i.e., the +y side) of the central axis J and on the forward side in the projecting direction (i.e., on the +x side) of the central axis J in the plan view of the inverter board 40. The terminal connection region 40b is arranged in the first corner portion 45a. At least one of the heat-generating elements 46 is arranged in the terminal connection region 40b. In the present example embodiment, two or more of the heat-generating elements 46 are arranged in the terminal connection region 40b. Specifically, heat-generating elements, such as, for example, an FET to protect against reverse connection, an LDO, etc., are arranged in the terminal connection region 40b. According to the present example embodiment, the terminals 51, which are connected to the inverter board 40, are arranged close to the heat-generating elements 46, and this contributes to shortening the wiring pattern of the inverter board 40. In addition, each of the heat-generating elements 46 can be efficiently cooled individually through the corresponding thermally conductive sheet 13c.

The wiring members 50 are arranged to extend from an interior of the second member 17 to a space outside of the second member 17 through the connector portion 17i. That is, the wiring members 50 are arranged to extend from the interior of the housing 11 to the space outside of the housing 11. The wiring members 50 are electrically connected to the external power supply (not shown). The wiring members 50 are electrically connected to the inverter board 40. In the present example embodiment, each wiring member 50 is made of a metal, and is in the shape of an elongated plate. Each wiring member 50 may alternatively be referred to as a busbar. The number of wiring members 50 is more than one.

Each wiring member 50 includes the terminal 51 at an end portion thereof. The terminal 51 is arranged in each wiring member 50. That is, the number of terminals 51 provided is more than one. The terminal 51 is arranged in one of both end portions of the wiring member 50 which is arranged in the interior of the housing 11. In the present example embodiment, the wiring member 50 is defined by a single monolithic member, and the terminal 51 defines a portion of the wiring member 50. The terminal 51 is arranged to extend in the axial direction in the interior of the inverter housing portion 13. The terminal 51 is arranged in the first corner portion 45a of the inverter board 40 in the plan view of the inverter board 40. The terminal 51 is inserted through the corresponding terminal insert hole 41. The terminal 51 is connected to the inverter board 40 through the solder 31.

The number of screw members 60 is more than one. Each screw member 60 is inserted through the corresponding screw insert hole 42. The screw member 60 includes a male screw portion. The male screw portion of the screw member 60 is inserted through the corresponding screw insert hole 42, and is screwed to the female screw portion of the corresponding support portion 12g. That is, the screw member 60 is inserted through the corresponding screw insert hole 42, and is fixed to the corresponding support portion 12g. The screw member 60 is used to fix the inverter board 40 to the housing 11.

At least two of the screw members 60 are arranged in the terminal connection region 40b. In the plan view of the inverter board 40, the terminals 51 are arranged between two of the screw members 60. Specifically, the terminals 51 are arranged between the two screw members 60 in the width direction. According to the present example embodiment, a relative displacement between the inverter board 40 and each terminal 51 due to thermal deformation, vibration, or the like can be prevented or limited, achieving an increase in the durability of the solder 31 used to fix the terminal 51 to the inverter board 40.

The coil support 80 is positioned between the motor 20 and the inverter board 40 in the axial direction. That is, the coil support 80 is arranged between the motor 20 and the inverter board 40. The coil support 80 is arranged to support the first end portions 29a of the coils 29 between the motor 20 and the inverter board 40. The coil support 80 is arranged to guide each of the first end portions 29a of the coils 29 in the axial direction toward the inverter board 40. In addition, the coil support 80 is arranged to support the second end portions 29b of the coils 29. The coil support 80 is arranged to support the second end portions 29b through the neutral point busbar 81, which will be described below. The coil support 80 is arranged to electrically connect the second end portions 29b of the coils 29 to one another through the neutral point busbar 81. That is, the neutral point busbar 81 is arranged to electrically connect the coils 29 to one another.

The coil support 80 is housed in the coil support housing space 13b. The coil support housing space 13b, the coil support 80, and the bearing 36 are arranged to overlap with one another when viewed in a radial direction. According to the present example embodiment, an additional reduction in axial dimension of the electric pump apparatus 1 can be achieved. The coil support 80 has a top and is in a double-tube shape. The coil support 80 includes an inner tube, an outer tube, and a top cover wall. The inner tube is in the shape of a hollow cylinder, and is arranged to extend in the axial direction. The outer tube is in the shape of a hollow cylinder, is arranged to extend in the axial direction, and is arranged to surround the inner tube from radially outside. The top cover wall is plate-shaped, having principal surfaces facing in the axial direction. The top cover wall is substantially in the shape of an annular plate. An inner circumferential portion of the top cover wall is joined to the inner tube. An outer circumferential portion of the top cover wall is joined to the outer tube. The coil support 80 is arranged to overlap with the stator 26 when viewed in the axial direction. The coil support 80 is arranged to overlap with the coils 29 when viewed in the axial direction.

The neutral point busbar 81 is made of a metal. When the coil support 80 is defined by an injection molding process, the neutral point busbar 81 is placed in a mold (not shown). A molten resin is filled into this mold and is hardened therein, so that the coil support 80 is defined together with the neutral point busbar 81 by an insert molding process. That is, the coil support 80 includes a portion made of the resin.

The neutral point busbar 81 includes coil end holding portions 81a and a holding portion coupling bar 81b. The coil end holding portions 81a are arranged to hold the second end portions 29b of the coils 29. Each coil end holding portion 81a is in the shape of the letter "V" when viewed in the axial direction. The number of coil end holding portions 81a is more than one. The coil end holding portions 81a are arranged apart from one another in the circumferential direction. The coil end holding portions 81a are arranged radially between the inner tube and the outer tube of the coil support 80. The holding portion coupling bar 81b is embedded in the inner tube of the coil support 80. The holding portion coupling bar 81b is plate-shaped, having principal surfaces facing in the axial direction, and is arranged to extend in the circumferential direction. The holding portion coupling bar 81b is joined to the coil end holding portions 81a. The holding portion coupling bar 81b is arranged to electrically connect the coil end holding portions 81a to one another.

The coil support 80 has a first region 80a and a second region 80b. Each of the first region 80a and the second region 80b is a region being semicircular when viewed in the axial direction (see FIG. 7). The first end portions 29a of the coils 29 are arranged in the first region 80a. The second end portions 29b of the coils 29 and the neutral point busbar 81 are arranged in the second region 80b. According to the present example embodiment, the first end portions 29a, which are arranged in the first region 80a of the coil support 80, are directly connected to the inverter board 40. That is, use of a busbar member to join end portions of coils to an inverter board as in related art is eliminated, and therefore, according to the present example embodiment, the motor 20 and the inverter board 40 can be arranged axially closer to each other. Thus, a reduction in the axial dimension of the electric pump apparatus 1 can be achieved. In addition, a reduced number of parts thereof can be achieved, resulting in a reduced production cost.

The coil support 80 includes a first wall portion 85 and a second wall portion 86. Each of the first wall portion 85 and the second wall portion 86 defines a portion of the top cover wall of the coil support 80. The first wall portion 85 is arranged in the first region 80a. The first wall portion 85 is arranged to have principal surfaces facing in the axial direction. The first wall portion 85 includes coil end insert holes 85a, the extension tubular portions 85b, and window portions 85c.

Each coil end insert hole 85a is arranged to pass through the first wall portion 85 in the axial direction. The coil end insert hole 85a is in the shape of a circular hole. The coil end insert hole 85a is arranged to have one of the first end portions 29a inserted therethrough. The number of coil end insert holes 85a is more than one. The coil end insert holes 85a are arranged in the projecting direction (i.e., the x-axis direction) in the first wall portion 85. Each extension tubular portion 85b is tubular, extending to the first axial side from one of the principal surfaces of the first wall portion 85 which faces to the first axial side. The extension tubular portion 85b is arranged to define a portion of the corresponding coil end insert hole 85a therein. The number of extension tubular portions 85b is more than one. The extension tubular portions 85b are arranged in the projecting direction in the first wall portion 85. In the present example embodiment, adjacent ones of the extension tubular portions 85b are joined to each other at portions of outer circumferential surfaces of the extension tubular portions 85b.

According to the present example embodiment, each extension tubular portion 85b contributes to lengthening the corresponding coil end insert hole 85a to the first axial side. Thus, the coil end insert hole 85a is able to guide the corresponding first end portion 29a of the coils 29 up to a position closer to the inverter board 40. This makes it easier to connect the first end portion 29a to the inverter board 40. In addition, an increase in the axial distance over which each coil end insert hole 85a guides the corresponding first end portion 29a makes it easier to ensure insulation of the first end portion 29a. Further, each extension tubular portion 85b is arranged in the corresponding tubular portion arrangement hole 17m of the bottom wall portion 17a. According to the present example embodiment, an additional reduction in the axial dimension of the electric pump apparatus 1 can be achieved.

Each window portion 85c is arranged to pass through the first wall portion 85 in the axial direction. The window portion 85c is arranged to overlap with a routed portion of at least one of the first end portions 29a, the routed portion lying on the second axial side of the first wall portion 85, when viewed in the axial direction. The routed portion is, for example, the third extending portion 29e. The number of window portions 85c is more than one. In at least one of the window portions 85c, the routed portions of two or more of the first end portions 29a are arranged to overlap with each other when viewed in the axial direction. According to the present example embodiment, the routed portion of at least one of the first end portions 29a, which is routed on the second axial side of the first wall portion 85, is viewable through at least one of the window portions 85c. Thus, routing of the first end portions 29a can be stably accomplished.

The second wall portion 86 is arranged in the second region 80b. The second wall portion 86 is arranged to have principal surfaces facing in the axial direction. The second wall portion 86 includes coil end draw-out holes 86a. Each coil end draw-out hole 86a is arranged to pass through the second wall portion 86 in the axial direction. The second end portions 29b are passed through the coil end draw-out holes 86a. That is, the second end portions 29b are drawn out to the first axial side through the coil end draw-out holes 86a.

The number of coil end draw-out holes 86a is more than one. The coil end draw-out holes 86a are arranged apart from one another in the circumferential direction. The coil end draw-out holes 86a and the coil end holding portions 81a are arranged to overlap with each other when viewed in the axial direction. The second wall portion 86 is arranged on the second axial side of the coil end holding portions 81a.

An axial position of the first wall portion 85 is on the first axial side of an axial position of the second wall portion 86. In the present example embodiment, the first wall portion 85 is arranged to support the first end portions 29a through the coil end insert holes 85a and the extension tubular portions 85b. Since the first wall portion 85 is arranged axially closer to the inverter board 40 than the second wall portion 86, the first end portions 29a supported by the first wall portion 85 can be stably connected to the inverter board 40.

A junction of the neutral point busbar 81 with each second end portion 29b, i.e., the coil end holding portion 81a, is arranged on the second axial side of one of the principal surfaces of the first wall portion 85 which faces to the first axial side, and on the first axial side of one of the principal surfaces of the second wall portion 86 which faces to the first axial side. According to the present example embodiment, a reduction in axial dimension of the coil support 80 can be achieved, and a reduction in the axial dimension of the electric pump apparatus 1 can be achieved.

The pump portion 90 is driven by power of the motor 20. The pump portion 90 is arranged to suck and discharge a fluid, such as, for example, an oil. The pump portion 90 is arranged on the second axial side of the motor 20. The pump portion 90 is arranged in a portion of the electric pump apparatus 1 on the second axial side. Although no illustration is provided, the pump portion 90 is joined to a flow channel of the fluid, such as, for example, the oil, the flow channel being defined in, for example, the driving apparatus of the vehicle. Accordingly, the portion of the electric pump apparatus 1 on the second axial side, in which the pump portion 90 is arranged, is fixed to a member of the vehicle.

In the present example embodiment, the pump portion 90 is arranged to have a structure of a trochoid pump. The pump portion 90 includes an inner rotor 91 and an outer rotor 92. Each of the inner rotor 91 and the outer rotor 92 is arranged to have a trochoid tooth profile. The inner rotor 91 is fixed to an end portion of the shaft 22 on the second axial side. Note that the inner rotor 91 and the shaft 22 may be permitted to rotate about the central axis J relative to each other within predetermined limits. The outer rotor 92 is arranged radially outside of the inner rotor 91. The outer rotor 92 is arranged to surround the inner rotor 91 from radially outside over the entire circumferential extent of the inner rotor 91.

The pump cover 95 is fixed to an end portion of the motor housing portion 12 on the second axial side, and is arranged to cover the pump portion 90 on the second axial side. That is, the pump cover 95 is fixed to the housing 11 to cover the pump portion 90. The pump cover 95 is fixed to the member of the vehicle (not shown). A surface of the pump cover 95 which faces to the second axial side is arranged to be in contact with the member of the vehicle. The pump cover 95 includes a cover portion 96 and the leg portions 97.

The cover portion 96 is arranged to overlap with the pump portion 90 when viewed in the axial direction, and is arranged to cover the pump portion 90 on the second axial side. That is, the cover portion 96 is arranged to cover the pump portion 90. The cover portion 96 includes the inflow port 96a and the outflow port 96b. Each of the inflow port 96a and the outflow port 96b is joined to the pump portion 90. The inflow port 96a is defined by a through hole passing through the cover portion 96 in the axial direction. The inflow port 96a is arranged to allow the fluid to flow into the pump portion 90 therethrough. That is, the pump portion 90 is arranged to suck the fluid from outside of the apparatus through the inflow port 96a. The outflow port 96b is defined by a through hole passing through the cover portion 96 in the axial direction. The outflow port 96b is arranged to allow the fluid to flow out of the pump portion 90 therethrough. That is, the pump portion 90 is arranged to discharge the fluid out of the apparatus through the outflow port 96b. In the present example embodiment, the inflow port 96a and the outflow port 96b are arranged in the projecting direction when viewed in the axial direction.

It is assumed that a direction leading from the inflow port 96a to the outflow port 96b when viewed in the axial direction is referred to as a fluid sending direction. The breather portion 14 is arranged on a forward side in the fluid sending direction of the central axis J when viewed in the axial direction (see FIG. 2). In the present example embodiment, the forward side in the fluid sending direction corresponds to the +x side, and the fluid sending direction is the same direction as the projecting direction. Therefore, the forward side in the projecting direction (i.e., the +x side) may alternatively be referred to as the forward side in the fluid sending direction, while the rearward side in the projecting direction (i.e., the −x side) may alternatively be referred to as a rearward side in the fluid sending direction. When the electric pump apparatus 1 is installed in the vehicle, the inflow port 96a is arranged on a lower side of a liquid surface of the fluid in the vertical direction to, for example, prevent the fluid from allowing an air entrainment or the like. The outflow port 96b is arranged on the upper side of the inflow port 96a in the vertical direction. That is, the forward side in the fluid sending direction includes the upper side in the vertical direction. According to the present example embodiment, the breather portion 14 is arranged on the upper side of the center of the electric pump apparatus 1 in the vertical direction, and this arrangement reduces the possibility that the breather portion 14 will be immersed in water or the like. In addition, it can thus be made easier to discharge a hot air inside of the housing 11 out of the apparatus through the breather portion 14.

Each leg portion 97 is connected to the cover portion 96, and is arranged radially outside of the cover portion 96. The leg portion 97 is arranged to project radially outward relative to the housing tubular portion 12a. The leg portions 97, the number of which is more than one, are arranged in the circumferential direction. The breather portion 14 is arranged between circumferentially adjacent ones of the leg portions 97 when viewed in the axial direction. Each leg portion 97 includes a bolt insert hole 97a defined in a radially outer end portion thereof. The bolt insert hole 97a is arranged to pass through the leg portion 97 in the axial direction. A bolt member (not shown) is inserted into the bolt insert hole 97a to fix the electric pump apparatus 1 to the member of the vehicle.

Note that the present disclosure is not limited to the above-described example embodiment, and that various modifications, etc., can be made without departing from the scope and spirit of the present disclosure, as described below, for example.

Although, in the above-described example embodiment, the projecting direction and the width direction have been defined along the imaginary plane (not shown) perpendicular to the central axis J, this is not essential to the present disclosure. For example, a direction parallel to the projecting direction may be referred to as a "first direction" regardless of the direction in which the connector portion 17*i* projects from the lateral wall portion 17*b*. That is, the first direction is a specific direction among directions along the imaginary plane perpendicular to the central axis J. In this case, one side (+x side) in the first direction corresponds to the forward side in the projecting direction, while another side (−x side) in the first direction corresponds to the rearward side in the projecting direction. In addition, the width direction may alternatively be referred to as a "second direction". That is, the second direction is a direction perpendicular to the first direction among the directions along the imaginary plane perpendicular to the central axis J. In this case, one side (+y side) in the second direction corresponds to the first widthwise side, while another side (−y side) in the second direction corresponds to the second widthwise side. Similarly, the fluid sending direction may alternatively be referred to as the "first direction".

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric pump apparatus comprising:
a motor;
an inverter board electrically connected to the motor;
a coil support arranged between the motor and the inverter board;
a housing arranged to house the motor, the inverter board, and the coil support; and
a pump portion driven by power of the motor; wherein
the motor includes:
  a rotor including a shaft arranged to extend along a central axis; and
  a stator arranged radially opposite to the rotor;
the stator includes a plurality of coils;
the coils have first end portions and second end portions drawn out from the coils, the first end portion and the second end portion defining both end portions of each of conducting wires of the coils;
the inverter board is arranged on a first axial side of the motor;
the coil support includes a neutral point busbar arranged to electrically connect the plurality of coils to one another;
the coil support has:
  a first region having the first end portions arranged therein, each first end portion being directly connected to the inverter board; and
  a second region having the second end portions and the neutral point busbar arranged therein, each second end portion being connected to the neutral point busbar;
the coil support includes:
  a first wall portion arranged in the first region, and having principal surfaces facing in an axial direction; and
  a second wall portion arranged in the second region, and having principal surfaces facing in the axial direction;
the first wall portion includes a coil end insert hole arranged to pass through the first wall portion in the axial direction, and have the corresponding first end portion inserted therethrough;

an axial position of the first wall portion is on the first axial side of an axial position of the second wall portion;
the first wall portion includes a window portion arranged to pass through the first wall portion in the axial direction;
at least one of the first end portions includes a routed portion arranged on a second axial side of the first wall portion; and
the window portion is arranged to overlap with the routed portion of at least one of the first end portions when viewed in the axial direction.

2. The electric pump apparatus according to claim 1, wherein a junction of the neutral point bulbar with each second end portion is arranged on a second axial side of one of the principal surfaces of the first wall portion which faces to the first axial side, and on the first axial side of one of the principal surfaces of the second wall portion which faces to the first axial side.

3. The electric pump apparatus according to claim 1, wherein the routed portions of two or more of the first end portions are arranged to overlap with each other in the window portion when viewed in the axial direction.

4. An electric pump apparatus comprising:
a motor;
an inverter board electrically connected to the motor;
a coil support arranged between the motor end the inverter board;
a housing arranged to house the motor, the inverter board, and the coil support; and
a pump portion driven by power of the motor; wherein
the motor includes:
  a rotor including a shaft arranged to extend along a central axis; and
  a stator arranged radially opposite to the rotor;
the stator includes a plurality of coils;
the coils have first end portions and second end portions drawn out from the coils, the first end portion and the second end portion defining both end portions of each of conducting wires of the coils;
the inverter board is arranged on a first axial side of the motor;
the coil support includes a neutral point busbar arranged to electrically connect the plurality of coils to one another;
the coil support has:
  a first region having portions arranged therein, each first end portion being connected to the inverter board; and
  a second region having the second end portions and the neutral point busbar arranged therein, each second end portion being connected to the neutral point busbar;
at least one of the first end portions includes:
a first extending portion arranged to extend from the corresponding coil to the first axial side;
a second extending portion arranged to extend in the axial direction, and connected to the inverter board; and
a third extending portion arranged to join an end of the first extending portion on the first axial side and an end of the second extending portion on a second axial side to each other, and arranged to extend in a direction that is not parallel to the central axis.

5. The electric pump apparatus according to claim 4, wherein a length of the third extending portion is longer than a length of a portion of the second extending portion which extends between the inverter board and the third extending portion.

6. The electric pump apparatus according to claim 4, wherein
the plurality of coils include:
a first coil including a first conducting wire; and
a second coil including a second conducting wire different from the first conducting wire;
the third extending portion of the first coil and the third extending portion of the second coil are arranged to overlap with each other when viewed in the axial direction; and
the third extending portion of the first coil and the third extending portion of the second coil are arranged apart from each other in the axial direction.

7. The electric pump apparatus according to claim 1, wherein
the motor includes a bearing arranged to rotatably support the shaft;
the housing includes an inverter housing portion arranged to house the inverter board;
the inverter housing portion includes a coil support housing space arranged to house the coil support;
the coil support is arranged in the coil support housing space; and
the coil support housing space, the coil support, and the bearing are arranged to overlap with one another when viewed in a radial direction.

8. The electric pump apparatus according to claim 1, wherein
the coil support includes a first wall portion arranged in the first region, and having principal surfaces facing in an axial direction; and
the first wall portion includes:
a coil end insert hole arranged to pass through the first wall portion in the axial direction, and have the corresponding first end portion inserted therethrough; and
an extension tubular portion being tubular, extending to the first axial side from one of the principal surfaces of the first wall portion which faces to the first axial side, and arranged to define a portion of the coil end insert hole therein.

9. The electric pump apparatus according to claim 8, wherein
the housing includes an inverter housing portion arranged to house the inverter board;
the inverter housing portion includes a bottom wall portion arranged opposite to one of a pair of principal surfaces of the inverter board which faces to a second axial side; and
the bottom wall portion includes a tubular portion arrangement hole arranged to pass through the bottom wall portion in the axial direction, and have the extension tubular portion arranged therein.

10. The electric pump apparatus according to claim 1, wherein the coil support further includes extension tubular portions which include coil end insert holes.

* * * * *